(12) United States Patent
Li

(10) Patent No.: US 9,749,435 B2
(45) Date of Patent: Aug. 29, 2017

(54) PROXY-BASED PUSH SERVICE

(75) Inventor: Li Li, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 814 days.

(21) Appl. No.: 13/355,441

(22) Filed: Jan. 20, 2012

(65) Prior Publication Data

US 2013/0190032 A1 Jul. 25, 2013

(51) Int. Cl.
*H04W 68/00* (2009.01)
*H04L 29/08* (2006.01)

(52) U.S. Cl.
CPC .............. *H04L 67/26* (2013.01); *H04L 67/28* (2013.01)

(58) Field of Classification Search
CPC ....... H04L 69/329; H04L 67/26; H04L 67/28; H04L 67/2842; H04L 29/08072; H04L 29/08801; H04L 51/22; H04L 51/36; H04L 67/2833; G06Q 10/107; H04W 4/14; H04W 4/18
USPC ....... 455/411, 414.1, 421, 412.1, 412.2, 419, 455/420, 456.5, 456.6, 432.3, 4, 66, 517, 455/413, 415, 418, 426.1; 709/206, 224, 709/225–229, 207, 201–203; 370/338, 370/412
See application file for complete search history.

(56) References Cited

U.S. PATENT DOCUMENTS

| | | | |
|---|---|---|---|
| 6,708,206 B1 * | 3/2004 | Thrane et al. ................ | 709/219 |
| 7,007,064 B2 * | 2/2006 | Faris .............................. | 709/203 |
| 7,801,509 B2 * | 9/2010 | Matsui et al. ................ | 455/411 |
| 7,895,309 B2 * | 2/2011 | Belali .................... | G06F 1/3209 |
| | | | 340/10.33 |
| 7,953,808 B2 | 5/2011 | Sharp et al. | |
| 8,918,529 B1 * | 12/2014 | Batchu .................... | H04L 63/08 |
| | | | 709/229 |
| 9,125,158 B2 * | 9/2015 | Ly-Gagnon ....... | H04W 52/0225 |
| 9,137,641 B2 * | 9/2015 | Kojima ................... | H04W 4/06 |
| 9,419,847 B2 * | 8/2016 | Laasik ............. | H04L 29/06183 |
| 9,503,540 B2 * | 11/2016 | Athas ....................... | H04L 67/26 |
| 9,554,239 B2 * | 1/2017 | Swaminathan ....... | H04W 4/008 |

(Continued)

FOREIGN PATENT DOCUMENTS

CN 1531816 A 9/2004
CN 102316423 A 1/2012

(Continued)

OTHER PUBLICATIONS

Trevor Armstrong et al, "Efficient and Transparent Dynamic Content Updates for Mobile Clients", MobiSys'06, Jun. 19-22, 2006, Uppsala, Sweden.

(Continued)

*Primary Examiner* — Bobbak Safaipour
(74) *Attorney, Agent, or Firm* — Sterne, Kessler, Goldstein & Fox P.L.L.C.

(57) ABSTRACT

A method and apparatus to proxy notification service connections between a mobile client and a notification server. In one embodiment of the invention, a proxy receives a proxy setup request for the notification service from the mobile client. The proxy further establishes a notification connection with the notification server for the mobile client and maintains the notification connection without waking an application processor of the mobile client. The proxy receives a notification from the notification service and forwards the notification to the mobile client.

20 Claims, 15 Drawing Sheets

(56) References Cited

U.S. PATENT DOCUMENTS

| | | | |
|---|---|---|---|
| 9,554,358 B2* | 1/2017 | Bienas | H04W 68/02 |
| 9,591,377 B2* | 3/2017 | Wu | H04N 21/647 |
| 9,609,597 B2* | 3/2017 | Zhang | H04W 52/0251 |
| 2005/0226430 A1* | 10/2005 | Kreifeldt | H04H 60/04 |
| | | | 381/58 |
| 2007/0299918 A1 | 12/2007 | Robert | |
| 2008/0293403 A1* | 11/2008 | Quon et al. | 455/426.1 |
| 2009/0143094 A1* | 6/2009 | Shen et al. | 455/550.1 |
| 2009/0265763 A1* | 10/2009 | Davies et al. | 726/3 |
| 2009/0305732 A1* | 12/2009 | Marcellino | H04L 12/587 |
| | | | 455/466 |
| 2010/0322122 A1* | 12/2010 | Synnergren | H04W 28/06 |
| | | | 370/310 |
| 2011/0249571 A1 | 10/2011 | Das | |
| 2012/0108225 A1* | 5/2012 | Luna et al. | 455/418 |
| 2013/0157624 A1* | 6/2013 | Talwar et al. | 455/412.1 |
| 2013/0157699 A1* | 6/2013 | Talwar et al. | 455/466 |
| 2013/0182624 A1* | 7/2013 | Sun | H04W 52/0212 |
| | | | 370/311 |
| 2013/0190032 A1* | 7/2013 | Li | H04L 67/28 |
| | | | 455/517 |

FOREIGN PATENT DOCUMENTS

| | | |
|---|---|---|
| CN | 202111746 U | 1/2012 |
| EP | 1 555 793 A2 | 7/2005 |
| EP | 1775911 A1 | 4/2007 |
| EP | 2 254 309 A1 | 11/2010 |
| JP | 2005323285 * | 11/2005 |
| JP | 2008-79161 A | 4/2008 |
| JP | 2008-510413 A | 4/2008 |
| JP | 2013-539258 A | 10/2013 |
| WO | WO 02/093898 A1 | 11/2002 |
| WO | WO 2006/025651 A1 | 3/2006 |
| WO | WO 2011/153313 A1 | 12/2011 |
| WO | WO 2012/024030 A2 | 2/2012 |

OTHER PUBLICATIONS

Ivana Podnar et al, "Mobile Push: Delivering Content to Mobile Users", Distributed Computing Systems Workshops, 2002. Proceedings. 22nd International Conference.

Niranjan Balasubraman Ian et al, "Energy Consumption in Mobile Phones: A Measurement Study and Implications for Network Applications", IMC '09, Nov. 4-6, 2009, Chicago, Illinois, USA.

Notification of transmittal of The International Search Report and The Written Opinion of The International Searching Authority, mailed Jul. 8, 2013, for International Application No. PCT/US2013/021598, filed Jan. 15, 2013, 10 pages.

Partial English Translation of Chinese Patent Publication No. CN 202111746U, published Jan. 11 2012, 3 pages.

English Abstract of Chinese Patent Publication No. CN 102316423A, published Jan. 11, 2012, 1 page.

English Translation of Office Action, dated Jul. 22, 2016, for Chinese Patent Application No. 201380005898.5, 15 pages.

English language abstract for Japanese Patent Publication No. JP 2008-79161 A, published Apr. 3, 2008, 2 pages, retrieved from http://worldwide.espacenet.com/.

* cited by examiner

PROXY-BASED PUSH SERVICE

BACKGROUND

Field

Embodiments of the invention relate to the field of mobile device processing; and more specifically, to managing notification service connections of mobile devices with a proxy.

Background

Users of a mobile device (e.g., laptop, palmtop, portable media player, smartphone, multimedia mobile phone, mobile gaming systems such as a "Gameboy", etc.) may subscribe to one or more notification services. For example, users may subscribe to one or more "push" email services such as .Mac, Microsoft Exchange ActiveSync, push-IMAP, Yahoo! Push, etc. In the case of a push email service, for example, the email server may automatically transmit email messages and/or calendar updates to the email client on the mobile device for the user without the user requesting the item. In other words, the user does not request (poll) the email server for email messages or other items of interest. Thus, a push notification service is a persistent notification service. In addition, other types of services may use a similar push architecture (e.g., update/upgrade services, news services, weblog services, podcast services, etc.). In order to maintain a push notification service, the mobile device periodically refreshes the connection to the push notification service (e.g., by transmitting a ping message to the push server).

In addition, users may subscribe to one or more "pull" services, such as "pull" email services (e.g., IMAP, POP3). In a pull email service, a user periodically checks (polls) the email server to determine if there are new email messages. If there are new email messages, they are then downloaded to the client. Many email clients support an automatic configuration of a poll interval. For example, a user of the mobile device may configure a poll interval of 10 minutes for a POP3 email account (thus the email client automatically polls the email server every 10 minutes to check for new email messages). In addition, notification services may be configured to provide network wide (e.g., Internet wide) event notification messages to multiple subscribers, where notification services may be automatically discovered by one or more subscribers and/or publishers, which is described in U.S. patent application Ser. No. 12/042,307, entitled "Automatic Notification System and Process", filed on Mar. 4, 2008, which is hereby incorporated by reference in its entirety.

A mobile device establishes a data context (e.g., a Packet Data Protocol (PDP) context) with one or more network elements that provide data services to the mobile device (e.g., Internet Protocol traffic from the Internet) over a network (e.g., a cellular network such as a Generic Packet Radio Services (GPRS) network, and/or a Local Area Network (LAN)). The data context is a logical association between the mobile device and the network elements, and includes information relating to routing (e.g., IP address information), Quality of Service (QoS), billing, authentication, etc. Since maintaining a data context consumes network resources of the network elements, the one or more servers may teardown a data context associated with a mobile device if the mobile device is not actively using the data context. For example, if the mobile device is turned off (and thus is not using the data context and not contacting the network elements), the network elements may teardown the data context after some time of not receiving information from the mobile device. The mobile device may periodically refresh the data context to keep the data context connection up.

In order to conserve battery life, a mobile device may enter into a reduced power mode when not connected to a constant power supply and not actively being used (e.g., an idle state). This is typically referred to as "sleep" mode. The sleep mode of particular mobile devices may be different depending on the characteristics of the mobile device. For example, in the case where the mobile device has network access, (e.g., cellular access, WiFi access, etc.), a sleep mode may include temporally putting the main processor to sleep and turning off the display, yet keeping the network stack in an operable function. Thus, while in sleep mode, an exemplary mobile device may continue to receive phone calls and/or items of interest from notification services (e.g., email messages from a push email service and/or from a pull email service). Once received, the mobile device may be awakened to process those phone calls and/or notifications. For example, a mobile device awakes after receiving a phone call while in sleep mode so a user may answer the phone call. Additionally, typical mobile devices typically cannot refresh the data context while in sleep mode (thus, a mobile device typically needs to be awake to refresh a data context).

SUMMARY OF THE DESCRIPTION

A method and apparatus to proxy notification service connections between a mobile client and a notification server. In one embodiment of the invention, a proxy receives a proxy setup request for the notification service from the mobile client. The proxy further establishes a notification connection with the notification server for the mobile client and maintains the notification connection without waking an application processor of the mobile client. The proxy receives a notification from the notification service and forwards the notification to the mobile client.

In another embodiment of the invention, a system includes a mobile client, a notification server, and a push proxy. The mobile client receives notifications from the notification service via the notification server and the push proxy proxies notification requests for the mobile client. The push proxy receives a proxy setup request for the notification service from the mobile client. The push proxy further establishes a notification connection with the notification server for the mobile client and maintains the notification connection with the notification server without waking an application processor of the mobile client. In addition, the push proxy receives a notification from the notification service and forwards the notification to the mobile client.

In a further embodiment of the invention, a device includes an application processor to execute in a first operating system and to perform a command function and a network connectivity element to execute in a second operating system and to perform a communication function. The network connectivity includes a push proxy, where the push proxy is configured to receive a proxy setup request for the notification service from the application processor. The push proxy further configured to establish a notification connection with a notification server for the device and to maintain the notification connection with the notification server without waking the application processor. In addition, the push proxy is configured to receive a notification from the notification service and forward the notification to the application processor.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
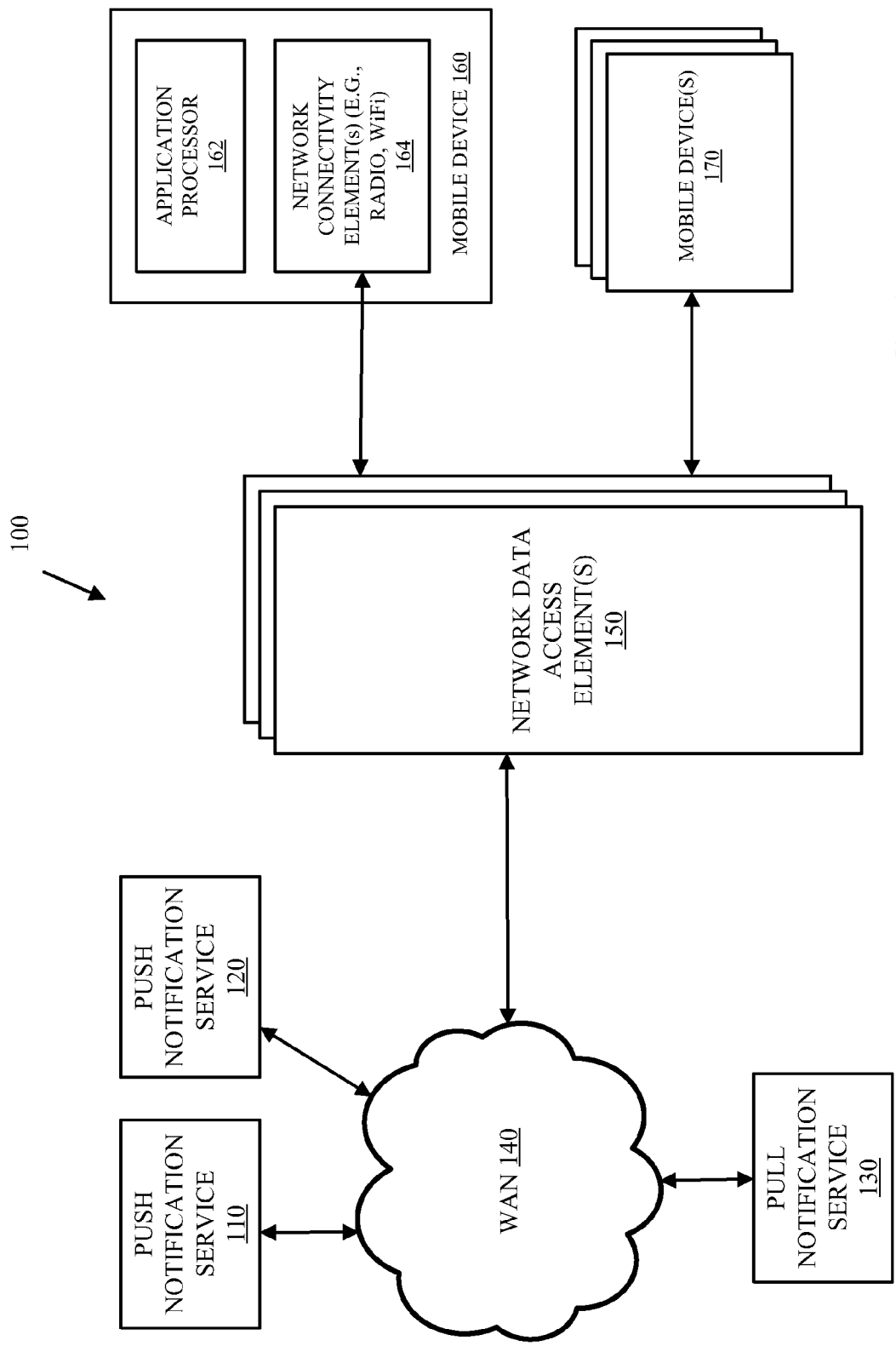
FIG. 1 illustrates an exemplary computing environment according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a mobile device (e.g., laptop, palmtop, portable media player, smartphone, multimedia mobile phone, mobile gaming system, etc.), a non-mobile device (e.g., desktop computer, workstation, server, etc.). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a keypad, a touchscreen, and/or a display), and one or more network connections. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Notification Service

A method and apparatus for managing notification service connections using the mobile client or by a proxy for the mobile client is described. In one embodiment of the invention, a mobile device (e.g., laptop, palmtop, portable media player, smartphone, multimedia mobile phone, mobile gaming systems such as a "Gameboy", etc.) includes one or more notification service clients (e.g., push notification service clients (e.g., push email clients such as .Mac, Microsoft Exchange, push-IMAP, Yahoo! Push, etc., update/upgrade services, news services, weblog services, podcast services, etc.) and/or pull notification service clients (e.g., pull email clients such as POP3, IMAP, etc.)). For each notification service client, the mobile device independently schedules a notification service connection message transmission interval and sets a notification service connection message transmission timer. In addition, a notification service connection message transmission window is associated with each notification service connection message transmission interval and is based on the value of the notification service connection message transmission interval. Upon a notification service connection message transmission timer expiring for a particular notification service client, the mobile device transmits a notification service connection message for that notification service, and also transmits a notification service connection message for each other notification service whose notification service connection message transmission window overlaps that expiring transmission timer. The mobile device resets the notification service connection message transmission timer for each notification service upon transmitting a notification service connection message.

In one embodiment of the invention, for each notification service connection, the mobile device schedules a time to wake the mobile device, if the mobile device is in sleep mode, in order to transmit a notification service connection message. If the mobile device is awake at a certain time, or is awakened during a scheduled wake at a certain time, the mobile device transmits a notification service connection message for each notification service whose notification service connection message transmission window overlaps that certain time. The mobile device resets the notification service connection message transmission timer for each notification service after transmitting a notification service connection message.

FIG. 1 illustrates an exemplary computing environment 100 according to one embodiment of the invention. The computing environment 100 includes the mobile devices 160 and 170 which are each coupled with one or more network data access elements 150. The network data access element(s) 150 may be part of various types of networks in different embodiments of the invention, including cellular networks (e.g., Global System for Mobile Communications (GSM), Enhanced Data Rates for GSM Evolution (EDGE), General Packet Radio Service (GPRS), Code Division Multiple Access (CDMA), Time Division-CDMA (TD-CDMA), Universal Mobile Telecommunications System (UMTS), Long Term Evolution (LTE), or other cellular networks), Local Area Networks (LANs), etc. For example, if the network data access element(s) 150 are part of a GSM network, the network data access element(s) 150 may include one or more of base transceiver stations (BTSs), Base Station Controllers (BSCs), Mobile Switching Centers (MSCs), Serving GPRS Support Nodes (SGSNs), etc. As another example, if the network data access element(s) 150 are part of a LAN, the network data access element(s) 150 may include one or more network switches, routers, hubs, modems, etc.

The mobile device 160 includes the application processor 162 and the network connectivity element(s) 164 (e.g., wireless network connectivity elements (e.g., radio network connectivity elements for cellular telephony, WiFi network connectivity elements), wired network connectivity elements (e.g., wired network interface controller(s) (NICs))). The mobile device 160 communicates with the network data access element(s) 150 via the network connectivity element(s) 164, through a data context (e.g., a PDP context). The Wide Area Network (WAN) 140 (e.g., the Internet) is coupled with the network data access elements 150. The push notification services 110 and 120 and the pull notification service 130 are coupled with the WAN 140. According to one embodiment of the invention, a user of the mobile device 160 accesses and uses the push notification services 110 and 120 and the pull notification service 130 (the push notification services 110 and 120 and the pull notification service 130 provide items of interest for the user). For example, the push notification service 110 may be providing a personal push email account for the user of the mobile device 160 while the push notification service 120 may be providing a work push email account for the user of the mobile device 160. As another example, the pull notification service 130 may be providing an organizational pull email account (e.g., POP3 email account, webmail account, etc.) for the user of the mobile device 160.

In one embodiment of the invention, the application processor 162 is the central processor of the mobile device 160. For example, the application processor 162 processes the operating system(s) of the mobile device 160 (the operating system is not illustrated in FIG. 1 in order not to obscure understanding of the invention), and any applications running on the mobile device 160. Other well known features of mobile devices are not illustrated in FIG. 1 in order not to obscure understanding of the invention, including input/output devices, memory(ies), power supply, displays, etc.

According to one embodiment of the invention, the mobile device 160 is capable of entering into a reduced power mode, known as "sleep mode". For example, if the mobile device 160 is not coupled with a constant power supply (e.g., not plugged into an electrical outlet), the mobile device 160 may periodically enter into sleep mode to conserve battery life of the device. The mobile device 160 may enter sleep mode in a number of different ways, including after a period of inactivity (e.g., 1 minute of inactivity) and/or directly by command from a user (e.g., a user may issue a command to the mobile device 160 to enter into sleep mode). It will be understood that other mechanisms of entering into sleep mode are within the scope of the invention.

During sleep mode, according to one embodiment of the invention, the mobile device 160 temporarily disables the application processor 162 (the application processor 162 may consume virtually no power when temporarily disabled). It should be understood that if the application processor 162 is disabled, the operating system and applications of the mobile device 160 are also disabled. However, according to one embodiment of the invention, at least some of the network connectivity element(s) 164 are not temporarily disabled. In other words, at least some of the network connectivity element(s) 164 may continue to receive information from the network data access elements 150, and use power. For example, if the mobile device 160 has the capability of receiving phone calls and/or text messages (e.g., Short Message Service (SMS) messages) the mobile device 160 may keep awake a radio connectivity element during sleep mode in order to receive phone calls and/or text messages. If the mobile device 160 disabled the radio connectivity element, for example, a user of the mobile device 160 would not be able to receive a phone call and/or text message (e.g., a phone call may instead be forwarded to voice mail if supported). It should be understood that in order to process those received phone calls and/or text messages (e.g., in order for a user to answer an incoming phone call), the mobile device 160 awakens from sleep mode (e.g., re-enables the application processor 162).

In addition, according to one embodiment of the invention, the mobile device 160 includes the capability of receiving items of interest from the push notification services 110-120 during sleep mode. For example, at least some of the network connectivity element(s) 164 have the capability of receiving the items of interest from the push notification services 110 and 120 during sleep mode (e.g., email messages, calendar updates, weather updates, stock updates, etc.). In one embodiment of the invention, a radio network connectivity element receives the items of interest sent from the push notification services 110 and 120 during sleep mode. Thus, during sleep mode, if the push notification services 110 and 120 provide push email service for a user of the mobile device 160, the mobile device 160 may receive email messages from the push notification services 110 and 120. According to one embodiment of the invention, the mobile device 160 awakens from sleep mode to process items of interest received during sleep mode.

While in some embodiments of the invention WiFi network connectivity elements are awake and functioning during sleep mode (and capable of receiving items of interest from the push notification services 110 and 120), in alternative embodiments of the invention WiFi network connectivity elements are put to sleep during sleep mode. In one embodiment, a radio network connectivity element may use less power than a WiFi network connectivity element. Thus, in this embodiment, keeping a WiFi network connectivity element awake during sleep mode causes a greater amount of power to be depleted than compared to keeping a radio network connectivity element awake. Thus, in some embodiments of the invention, the mobile device 160 may receive items of interest from the push notification services 110 and 120 during sleep mode via a Wi-Fi network connectivity element, while in other embodiments of the invention the mobile device 160 does not receive items of interest during sleep mode via the WiFi network connectivity element.

In some embodiments of the invention, the mobile device 160 may use a combination of network connectivity elements to receive items of interest from the push notification services 110 and 120. For example, the mobile device 160 may support receiving data information via a radio network connectivity element (e.g., through a cellular network) and/or via a WiFi network connectivity element (e.g., when connected at a home LAN). The user of the mobile device 160 may configure the mobile device 160 such that a WiFi network connectivity element is used when WiFi service is available (e.g., while connected at a home LAN and/or work LAN) and the radio network connectivity element is used when WiFi service is not available. Thus, in one embodiment of the invention, a radio network connectivity element and/or a WiFi network connectivity element may be used to receive items of interest from the push notification services 110 and 120 depending on which network connectivity element is providing data support. In addition, in one embodiment of the invention, a radio network connectivity element and/or a WiFi network connectivity element may be used to receive items of interest from the push notification services 110 and 120 during sleep mode depending on which network connectivity element was providing data support prior to entering into sleep mode (e.g., if within a LAN and the WiFi network connectivity element was receiving items of interest from the push notification services 110 and 120 while the mobile device 160 was awake, during sleep mode the WiFi network connectivity element stays awake to receive items of interest and the mobile device 160 places the radio network connectivity element to sleep).

In one embodiment of the invention, a WiFi network connectivity element may use more power than a radio network connectivity element, regardless of which network connectivity element was providing data support prior to entering into sleep mode, and the mobile device 160 puts the WiFi network connectivity element to sleep (e.g., temporarily disables the WiFi network connectivity element) and uses a radio network connectivity element to receive items of interest from the push notification services during sleep mode. For example, if the mobile device 160 is connected with the push notification services 110 and 120 via a LAN (e.g., a home LAN of the user) and the user issues a command to place the mobile device 160 into sleep mode, the mobile device 160 automatically transitions to connecting with the push notification services 110 and 120 via a cellular network (through a radio connectivity element) and places the WiFi connectivity element to sleep.

The persistent notification service connections (e.g., push notification services 110 and 120) are periodically refreshed in order to maintain the persistency of the connections in some embodiments of the invention. For example, the push notification services 110 and 120 may timeout a connection to the mobile device 160 (thus stopping push notification services for the user) if the mobile device does not actively use that connection. Thus, in some embodiments of the invention, the mobile device 160 is required to communicate with the push notification services 110 and 120 in order to maintain its persistent connections. For example, at some periodic interval, the mobile device 160 transmits a notification service connection message to the push notification services 110 and 120 to refresh the connections. The notification service connection message informs the push notification services 110 and 120 that the mobile device 160 is still connected (and presumably wishes to continue to receive items of interest from the push notification services). It should be understood that refreshing the push notification connections informs the push notification service's servers that the mobile device wishes to remain connected to the service. In addition, refreshing the push notification connections informs each network element along the route to the push notification service's servers to maintain the connection (otherwise, e.g., a network element may clear the network resources associated with that connection). The notification service connection message may be a ping message or other keep alive message. The notification services may respond to a notification service connection message to notify the mobile device 160 that the connection is active. Thus, if the mobile device 160 does not receive a response from a notification service, the mobile device 160 may be required to re-establish the session with the notification service. It should be understood that in some embodiments of the invention, receipt of an item of interest from a notification service also refreshes the persistent notification service connection.

The interval of transmitting a notification service connection message may be different for individual notification services. For example, the push notification service 110 may cause a timeout of the connection if there is 30 minutes of no communication while the push notification service 120 may cause a timeout of the connection if there is 15 minutes of no communication. However, these timeout intervals are not static and may change dynamically depending on different network conditions. In addition, the notification services may not notify the mobile device that a timeout interval has been modified. Thus, the mobile device 160, in an attempt to maintain the connection (without having to re-establish the connection), may transmit a notification service connection message within the known timeout interval. It will be understood that the mobile device 160 is required to be awake to transmit a notification service connection message to refresh and maintain a notification service connection.

In addition, in some embodiments of the invention, the mobile device 160 is required to periodically refresh the connection with the network data access element(s) 150 in order to maintain network data connectivity (e.g. such as NAT routers in the carrier's network, firewalls, or other network elements in the network). For example, since the data context consumes network resources, the network data access element(s) 150 may tear down the data context if it is not actively being used and/or has not been used in a certain amount of time (e.g., the data context is removed and the network resources of that data context are reallocated). It should be understood that if the data context is torn down, the mobile device 160 is not connected with any notification services. Of course, it should also be understood that the data context may be torn down for other reasons besides period of inactivity (e.g., if the location of the mobile device is out of range of the network, if the mobile device 160 is turned off, etc.). In other embodiments of the invention, the data context does not have to be refreshed by the mobile device 160. Typically, the data context timeout interval is less than the notification service timeout interval. If the data context is up, a notification service connection message transmitted by the mobile device 160 to a notification service inherently refreshes the connection with the network data access element(s) 150.

Figure 2:
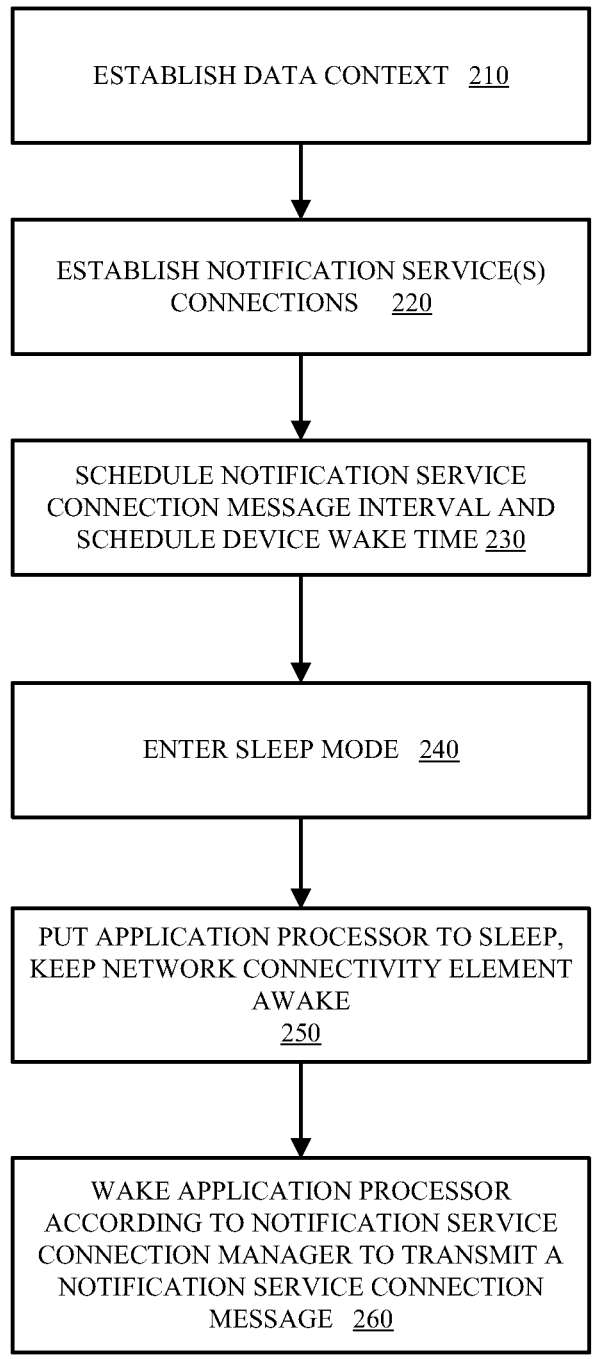
FIG. 2 illustrates an exemplary flow for a mobile device establishing notification service connections and scheduling notification service connection message transmission intervals according to one embodiment of the invention.

FIG. 2 illustrates an exemplary flow for a mobile device establishing notification service connections and scheduling notification service connection message transmission intervals according to one embodiment of the invention. The operations of FIG. 2 will be described with reference to the exemplary embodiment of FIGS. 1, 3A, and 4. However, it should be understood that the operations of FIG. 2 can be performed by embodiments of the invention other than those discussed with reference to FIGS. 1, 3A, and 4, and the embodiments discussed with reference to FIGS. 1, 3A, and 4 can perform operations different than those discussed with reference to FIG. 2.

At block 210, the mobile device 160 establishes a data context. The data context may be established by any number of methods known in the art. From block 210, flow moves to block 220 where the mobile device 160 establishes one or more notification services connections. For example, referring to FIG. 1, the mobile device 160 establishes a connection with the push notification services 110 and 120 and the pull notification service 130. In some embodiments of the invention, the connections are each Transmission Control Protocol (TCP) connections. Flow moves from block 220 to block 230.

At block 230, the mobile device schedules a notification service connection message transmission interval and schedules device wake times for each of the notification service connections. For example, the mobile device 160 may schedule a notification service connection message transmission interval of 30 minutes for the push notification service 110, an interval of 15 minutes for the push notification service 120, and an interval of 25 minutes for the pull notification service 130. In addition, the mobile device 160 may schedule a wake time that coincides with those transmission intervals. Flow moves from block 230 to block 240.

At block 240, the mobile device 160 enters into sleep mode. As described previously, the mobile device 160 may enter sleep mode in a number of different ways, including after a period of inactivity (e.g., 30 minutes of inactivity) and/or directly by command from a user (e.g., a user may issue a command to the mobile device 160 to enter into sleep mode). Flow moves from block 240 to block 250. At block 250, the application processor of the mobile device is put to sleep and the network connectivity element(s) are kept awake, for example, to maintain the notification service connections. Flow moves from block 250 to block 260 where the application processor is wakened according to the notification service connection manager to transmit a notification service connection message.

Figure 3A:
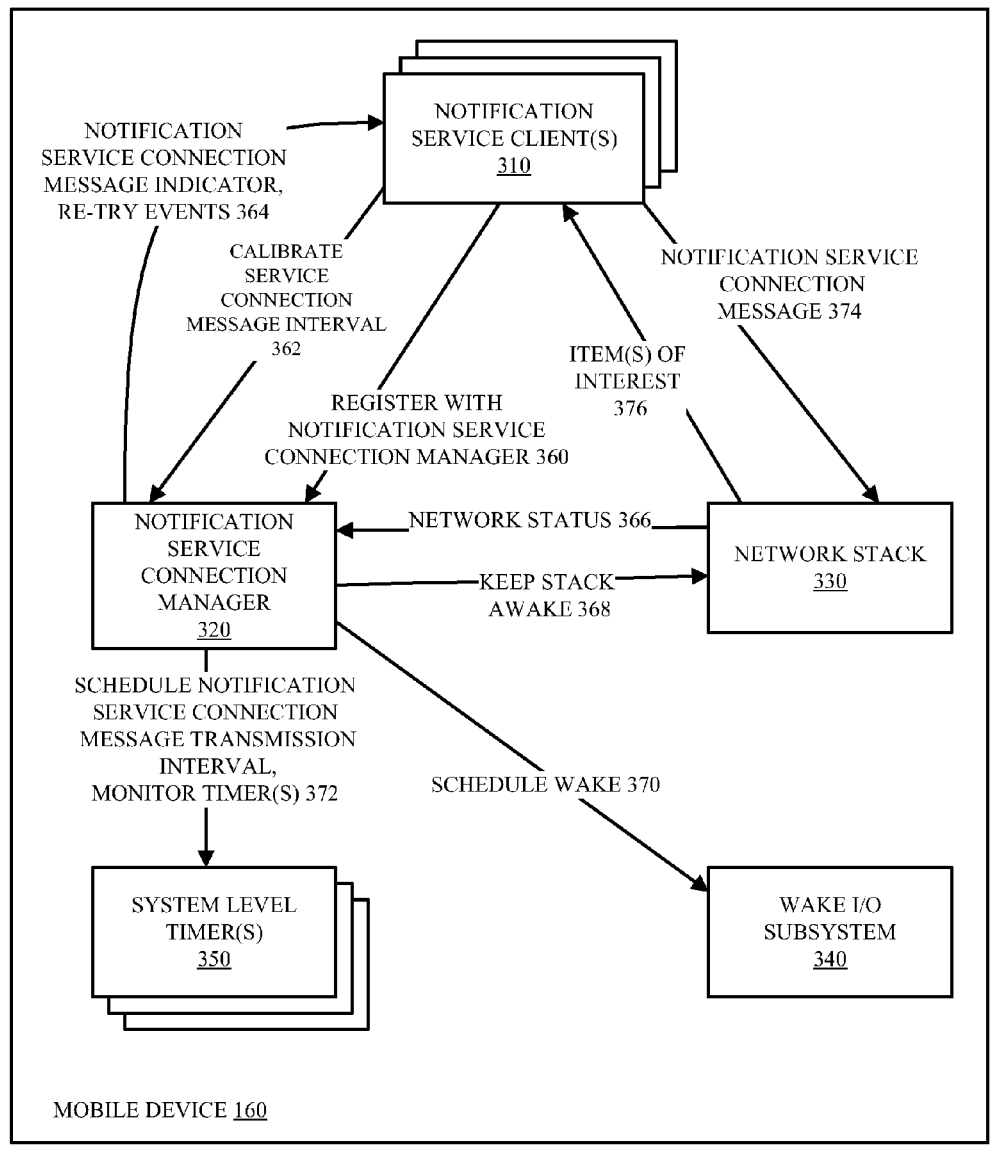
FIG. 3A is a block diagram illustrating a framework of an exemplary mobile device to manage notification service connections according to one embodiment of the invention.

FIG. 3A illustrates a framework used by an exemplary mobile device managing notification service connections according to one embodiment of the invention. For example, the mobile device 160 uses the framework illustrated in FIG. 3A to manage the connections to the push notification services 110 and 120 and the pull notification service 130. The framework includes one or more notification service clients 310. For example, with reference to FIG. 1, there may be a total of three notification service clients 310 (e.g., a notification service client for the push notification service 110, a notification service client for the push notification service 120, and a notification service client for the pull notification service 130). Each notification service client 310 individually is coupled with the service connection manager 320 and the network stack 330. For example, in one embodiment of the invention, each notification service client is an independent process, and does not share memory with other notification service clients and/or does not communicate with other notification service clients. Each notification service client registers 360 with the notification service connection manager 320.

The notification service connection manager 320 is coupled with one or more system level timers 350, the network stack 330, and the wake I/O subsystem 340. The service connection manager 320 schedules a notification service connection message transmission interval with use of the system level timer(s) 350, and monitors those timers, as indicated by numeral 372. In addition, the service connection manager 320, with use of the I/O subsystem 340, schedules wakes of the mobile device in relation to the notification service connection message transmission interval, as indicated by number 370 (e.g., the wake may be scheduled at a time close to the end of the notification service connection message transmission interval), and associates a notification service connection message transmission window with the notification service connection message transmission interval. The service connection manager 320 also keeps the network stack 330 alive during a sleep mode of the mobile device, as indicated by numeral 368.

The network stack 330 includes support for the network connectivity elements (e.g., radio connectivity element and/or WiFi connectivity element). The network stack 330 is used to communicate with the notification services (and with other entities throughout the network). The network stack 330 provides the notification service connection manager 320 with the status of the network, as indicated by numeral 366. For example, the notification service connection manager 320 notifies the service connection manager 320 of network conditions (e.g., network congestion, statistics, etc.). In addition, the network stack 330 receives item(s) of interest from the network services and transmits them to the appropriate notification service client 310, as indicated by numeral 376. In addition, the network stack 330 notifies the notification service client 320 if a communication from one of the notifications services was received (e.g., if a reply to a notification service connection message transmission was received).

According to one embodiment of the invention, after a timer for a notification service connection has elapsed, the service connection manager 320 instructs the notification service client 310 to transmit a notification service connection message, and also notifies the notification service client 310 of any re-try events, as indicated by the number 364 (e.g., a re-try event may include re-establishing a dropped notification service connection). The notification service client 310, with use of the network stack 330, transmits notification service connection messages, as indicated by numeral 374. In addition, the notification service client 310 may instruct the service connection manager 320 to calibrate the notification service connection message transmission interval, as indicated by number 362. Calibrating the notification service connection message transmission interval is discussed in greater detail with reference to FIG. 6.

Figure 3B:
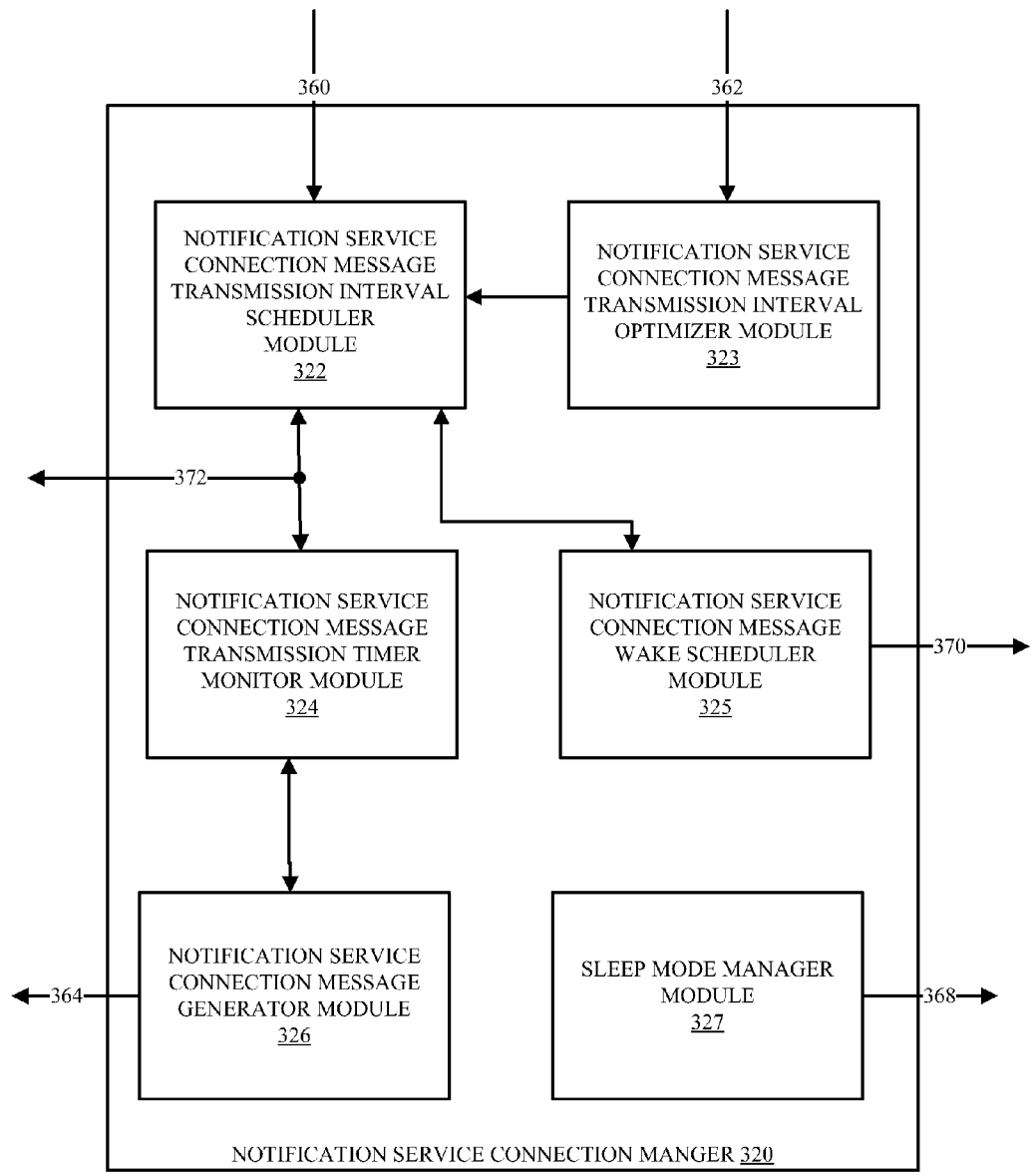
FIG. 3B is a block diagram illustrating an exploded view of the notification service connection manager of FIG. 3A according to one embodiment of the invention.

FIG. 3B is a block diagram illustrating an exploded view of the notification service connection manager 320 of FIG. 3A according to one embodiment of the invention. The notification service connection manager 320 includes the notification service connection message transmission interval scheduler module 322, the notification service connection message transmission interval optimizer module 323, the notification service connection message transmission timer monitor module 324, the notification service connection message wake scheduler module 325, the notification service connection message generator module 326, and the sleep mode manager module 327.

According to one embodiment of the invention, the interval scheduler module 322 schedules the notification service connection message transmission intervals. In addition, the interval scheduler module associates a notification service connection message transmission window with the scheduled notification service connection message transmission intervals. The interval scheduler module 322 is coupled with the notification service connection message transmission timer monitor module 324. In one embodiment of the invention, the timer monitor module monitors the one or more system level timer(s) 350 including a notification service connection message transmission timer. The interval scheduler module 322 is also coupled with the notification service connection message wake scheduler module. According to one embodiment of the invention, the wake scheduler module 322 schedules wakes of the mobile device based on notification service connection message transmission intervals.

The timer monitor module 324 is coupled with the notification service connection message generator module 326. According to one embodiment of the invention, the message generator module 326 alerts the notification service client(s) 310 to issue a notification service connection message. The interval optimizer module 323 is coupled with the interval scheduler module 322. According to one embodiment of the invention, the interval optimizer module optimizes notification service connection message transmission intervals, which will be described in greater detail with reference to FIG. 6. In one embodiment of the invention, the sleep mode manager 327 keeps the network stack 330 awake during a sleep mode.

Figure 4:
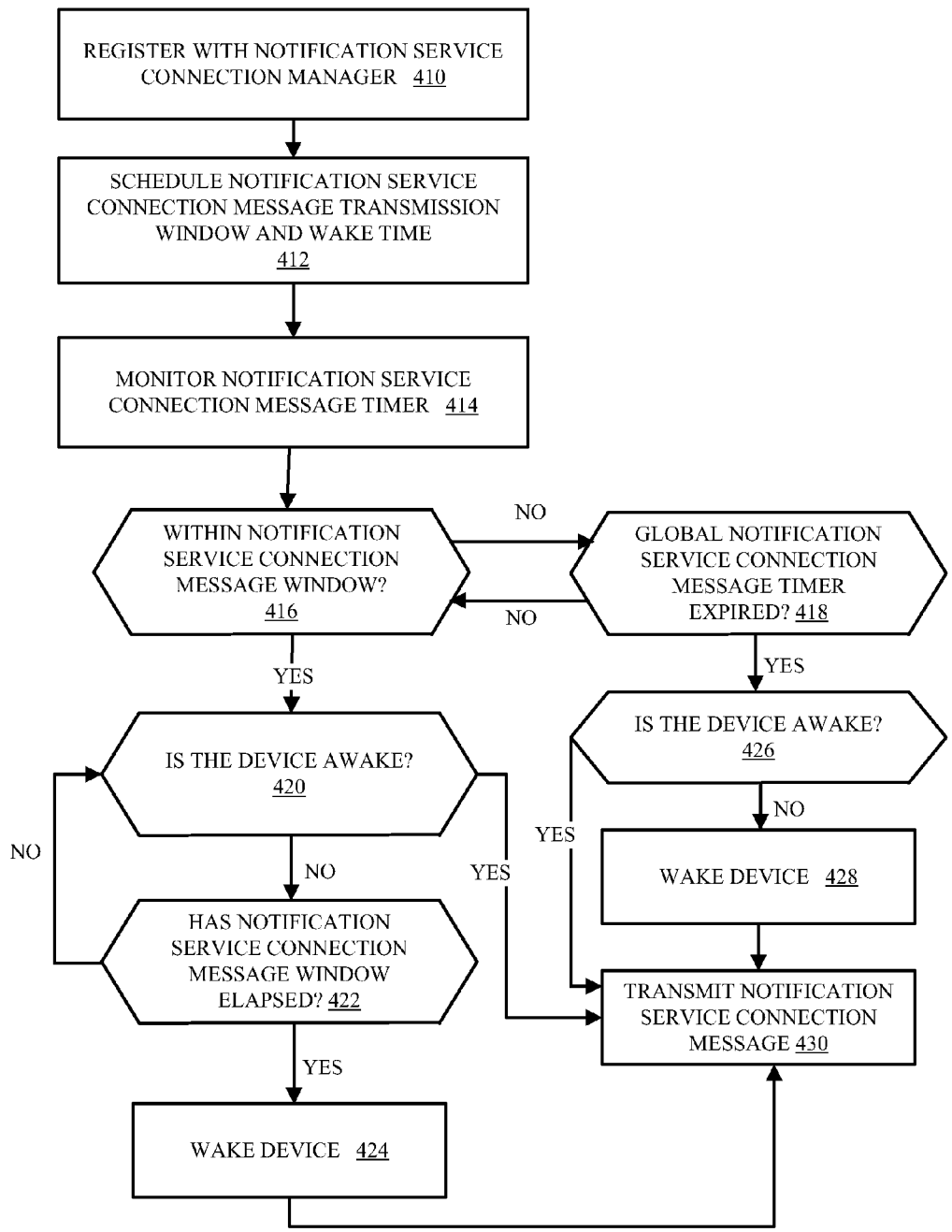
FIG. 4 is a flow diagram illustrating managing notification service connections according to one embodiment of the invention.
Figure 5:
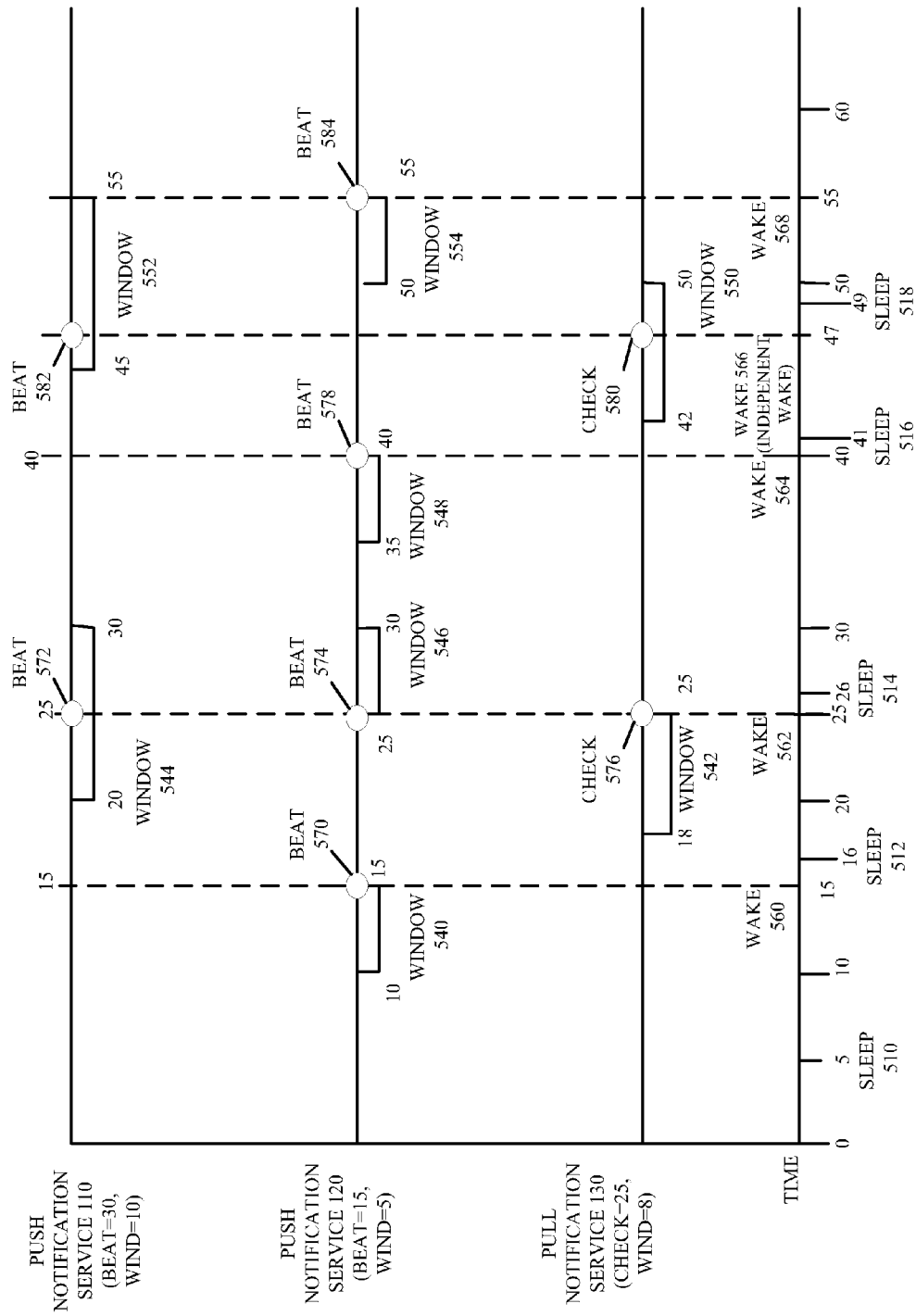
FIG. 5 is an exemplary graph illustrating a mobile device synchronizing transmission of notification service connection messages based on overlapping notification service connection message transmission windows according to one embodiment of the invention.

FIG. 4 is a flow diagram illustrating managing notification service connections according to one embodiment of the invention. The operations of FIG. 4 will be described with reference to the exemplary embodiments of FIGS. 3A and 5. However, it should be understood that the operations of FIG. 4 can be performed by embodiments of the invention other than those discussed with reference to FIGS. 3A and 5, and the embodiments discussed with reference to FIGS. 3A and 5 can perform operations different than those discussed with reference to FIG. 4. FIG. 5 is an exemplary graph illustrating a mobile device synchronizing transmission of notification service connection messages based on overlapping notification service connection message transmission windows according to one embodiment of the invention.

According to one embodiment of the invention, each notification service client on a mobile device performs the operations of FIG. 4, independently. At block 410, a notification service client (e.g., a push notification service client or a pull notification service client) registers with a notification service connection manager. For example, with reference to FIGS. 3A and 5, the notification push notification services 110, 120, and the notification pull notification service 130 (each a notification service client 310) each independently register with the notification service connection manager 360. From block 410, flow moves to block 412.

At block 412, the mobile device 160 schedules a notification service connection message transmission interval and a wake time in relation to the service connection message transmission interval for each notification service. However, as will be described later herein, the actual wake times of the mobile device for a particular notification service connection may differ depending on other notification services. According to one embodiment of the invention, the initial service connection message transmission interval for the persistent notification services (e.g., push notification services) is based on a notification service timeout value provided by each persistent notification service. For example, referring to FIG. 5, the push notification service 110 includes a notification service timeout value of 30 minutes (thus, if the connection to the push notification service 110 is not used within a 30 minute time period, the push notification service 110 may remove that connection), and the push notification service 110 includes a notification service timeout value of 15 minutes. In order to simplify understanding of the invention, in FIG. 5, the notification service connection message transmission intervals for the push notification services 110 and 120 coincide with the timeout value. For example, the notification service connection message transmission interval is 30 minutes for the push notification service 110 and 15 minutes for the push notification service 120. However, it should be understood that the notification service connection message transmission interval may not coincide with the timeout value (e.g., the interval may be less than the timeout value). It should also be understood that in some embodiments of the invention, the notification service connection message transmission intervals may be optimized and may change over time, which will be described in greater detail with reference to FIG. 6. In addition, in order to simply understanding of the invention, a default wake time for each notification service connection is scheduled at the end of the notification service connection message transmission interval. Also, throughout the discussion of FIG. 5, transmission of a notification service connection message may be referred to as a "heartbeat" or simply a "beat" in reference to a notification service connection message sent to a persistent notification service (e.g., push services 110 and 120).

Referring back to FIG. 4, the mobile device 160 also associates a notification service connection message transmission window with the message transmission interval and sets one or more system timers associated with the message transmission interval. According to one embodiment of the invention, a notification service connection message transmission window is a portion of the message transmission interval where a notification service connection message may be transmitted. For example, if the mobile device is awake during any time within the window, the mobile device may transmit a notification service connection message. In FIG. 5, the notification service connection message transmission windows are roughly a third of the notification service connection message transmission window. For example, the notification service connection message transmission window of the push notification service 110 is 10 minutes before a scheduled transmission of a beat message (e.g., the 10 minutes prior to the scheduled beat), the notification service connection message transmission window of the push notification service 120 is 5 minutes before a scheduled beat, and the notification service connection message transmission window of the pull notification service 130 is 8 minutes before a scheduled pull. Although FIG. 5 illustrates the notification push notification services 110 and 120 and the notification pull notification service 130 starting at the same time (e.g., at time 0), it should be understood that this is for illustrative purposes and these notification services may start at different times. With reference to FIG. 5, the push notification service 110 has an initial scheduled heartbeat and wake time at 30 minutes, the push notification service 120 has an initial scheduled heartbeat and wake time at 15 minutes, and the pull notification service 130 has an initial scheduled pull message and wake time at 25 minutes.

With reference to FIG. 4, flow moves from block 412 to block 414 where the mobile device monitors service connection message timers (e.g., system level timers associated with each service connection) and flow moves to block 416. For example, with reference to FIG. 5, the mobile device monitors timers for the push notification services 110 and 120 and the pull notification service 130. In FIG. 5, at time 5, the mobile device enters into sleep mode 510. Thus, according to one embodiment of the invention, the application processor and the operating system of the application processor are offline yet the network connectivity element remains awake.

At block 416, the mobile device determines if the time is within a notification service connection message transmission window. If the time is not within a notification service connection message transmission window, then flow moves to block 418 where a determination is made whether a global notification service connection message timer has expired. The global notification service connection message timer will be discussed in greater detail later herein. If time is within a notification service connection message transmission window, then flow moves to block 420 where a determination is made whether the mobile device is awake. If the device is awake, then flow moves to block 430 where the mobile device transmits a notification service connection message. If the mobile device is not awake (i.e., if in sleep mode), then flow moves to block 422 where a determination is made whether a notification service connection message transmission timer has elapsed. For example, referring to FIG. 5, beginning at time 10, the push notification service 120 is within the window 540, and the mobile device 160 is not awake (it is in sleep mode). If the timer has not elapsed, then flow moves back to block 420. If the timer has elapsed, then flow moves to block 424 where the mobile device is awakened and flow moves to block 430 where the mobile device transmits a notification service connection message.

Referring to FIG. 5, the notification service connection message transmission timer associated with the push notification service 120 elapses at time 15. Thus, at time 15, the mobile device 160 is wakened (represented by the dashed line wake 560) and a notification service connection message is transmitted to the push notification service 120 in order to refresh the notification service connection (represented by the beat 570). It should be understood that the mobile device 160 does not transmit a notification service connection message to the push notification service 110 or the pull notification service 130 during the wake time 560. For example, the push notification service 110 has a beat interval of 30 minutes. Thus to refresh the connection to the push notification service 110, a beat may be transmitted up to 30 minutes (i.e., the connection needs only be refreshed once every 30 minutes). If the mobile device 110 transmitted a beat to the push notification service 110 each and every time a beat was transmitted to the push notification service 120, which has a beat interval of 15 minutes, effectively twice as many beat messages as necessary would be transmitted. Thus, according to one embodiment of the invention, the mobile device transmits notification service connection messages to a particular notification service only if it is awake during a notification service connection message transmission window for that particular notification service. Since the wake 560 does not overlap a notification service connection message transmission window for the push notification service 110 or the pull notification service 130, the mobile device does not transmit notification service connection messages for those notification services in order to conserve bandwidth.

According to one embodiment of the invention, the mobile device resets the notification message transmission timer associated with a particular notification service upon transmitting a notification service connection message to the particular notification service. For example, the mobile device 160 resets the notification service connection message transmission timer for the push notification service 120 upon transmitting the beat message 570.

At time 16, the device enters sleep mode 512. In other words, the mobile device 160 was awakened specifically to refresh the notification service connection to the notification push notification service 120 and the device reenters sleep mode in order to conserve battery resources. At time 25, the notification service connection message transmission timer associated with the pull notification service 130 expires (e.g., the time period is at the end of the window 542). Thus, at time 25, the mobile device 160 is wakened (represented by the dashed line wake 562) and a notification service connection message is transmitted to the pull notification service 130 in order to check for items of interest (represented by the check 576). In addition, since the window 544 of the push notification service 110 overlaps the time of the wake 562 (the window 544 begins at time 20 and ends at time 30), and the window 546 of the push notification service 120 overlaps the time of the wake 562 (the window 546 begins at time 25 and ends at time 30), the mobile device 160 transmits a notification service connection message to the push notification service 110 (represented by the beat 572) and transmits a notification service connection message to the push notification service 120 (represented by the beat 574). Thus, during the wake 562, the mobile device 160 transmits a notification service connection message to each of the push notification services 110 and 120 and the pull notification service 130.

Since the mobile device 160 transmitted a notification service connection message to the push notification service 110, the push notification service 120, and the pull notification service 130, according to one embodiment of the invention, the mobile device 160 resets the notification service connection message transmission timer, reschedules the notification service connection message transmission time and wake time, for each notification service. For example, instead of the push notification service 110 having a scheduled notification service connection message transmission time at time 60, since a notification service connection message was transmitted to the push notification service 110 at time 25, the mobile device 160 schedules a notification service connection message transmission at time 55. As another example, instead of the push notification service 120 having a scheduled notification service connection message transmission time at time 45, since a notification service connection message was transmitted to the push notification service 120 at time 25, the mobile device 160 schedules a notification service connection message transmission at time 40. At time 26, the mobile device 160 enters into sleep mode 514.

It should be understood that, in one embodiment, battery resources are conserved by synchronizing transmission of notification service connection messages based on overlapping notification service connection message transmission windows. For example, consolidating transmission of notification service connection messages for multiple notification services during a same wake period conserves battery resources. For example, waking a mobile device uses a significant amount of battery resources. Additionally, more battery resources are used when waking the device as compared with transmitting notification service connection messages. Thus, transmitting a notification service connection message to multiple notification services during the same wake period conserves battery resources (e.g., the mobile device is not independently awakened from sleep mode for each notification service connection message transmission). Thus, in some embodiments of the invention, synchronizing transmission of notification service connection messages based on overlapping notification service connection message transmission windows reduces the number of mobile device wakes needed, which reduces power consumption. It should be understood that the battery resource savings increase as the number of notification service clients increases.

In addition, while transmission of the notification service connection messages are not necessarily performed at their scheduled transmission time, (e.g., the notification service connection messages may be sent prior to their scheduled transmissions times), the deviance from the scheduled transmission time is low (e.g., typically the notification service connection message transmission window is approximately a third of the notification service connection message transmission interval). Thus, embodiments of the invention conserve bandwidth by transmitting notification service connection messages close to their scheduled transmission time.

At time 40, the notification service connection message transmission timer associated with the push notification service 120 expires (e.g., the time period is at the end of the window 548). Thus, at time 40, the mobile device 160 is wakened (represented by the dashed line wake 564) and a notification service connection message is transmitted to the push notification service 120 in order to refresh the push notification service 120 connection. Since the wake 564 does not overlap a notification service connection message transmission window for the push notification service 110 or the pull notification service 130, the mobile device does not transmit notification service connection messages to those notification services in order to conserve bandwidth. At time 41, the mobile device 160 enters into sleep mode 516.

At time 47, the mobile device 160 is awakened from the sleep mode 516 from an independent event (represented by independent wake 566). There may be many causes of an independent wake, including user interaction (e.g., the user disables sleep mode), receiving an item of interest (e.g., receiving an email message from the push notification service 110), receiving a phone call and/or text message, etc. Once awake, the mobile device determines whether the time is within any notification service connection message transmission window. For example, time 47 is within the window 552 for the push notification service 110 (which starts at time 45 and ends at time 55) and within the window 550 for the pull notification service 130 (which starts at time 42 and ends at time 50). Leveraging the fact that the mobile device is awake and within notification service connection message transmission windows, the mobile device transmits a notification service connection message to the push notification service 110 (represented by the beat 582) to refresh the push notification service connection 110, and transmits a notification service connection message to the pull notification service 130 (represented by the check 580) to check for items of interest. In addition, while not illustrated in FIG. 5 for simplicity purposes, the mobile device 160 resets the notification service connection message transmission timer and reschedules the notification service connection message transmission time and wake for the push notification service 110 and the pull notification service 130. At time 49, the mobile device enters sleep mode 518.

At time 55, the notification service connection message transmission timer associated with the push notification service 120 expires (e.g., the time period is at the end of the window 554). Thus, at time 55, the mobile device 160 is wakened from the sleep mode 518 (represented by the dashed line wake 568) and a notification service connection message is transmitted to the push notification service 120 to refresh the push notification service 120 connection (represented by the beat 584). It should be noted that although the window 552 of the push notification service 110 originally would have overlapped the wake 568, because the beat 582 was transmitted at time 47, and the notification service connection message timer as reset and the notification service connection message transmission time rescheduled, the mobile device 160 does not transmit a notification service connection message to the push notification service 110.

With reference to FIG. 4, as described earlier, at block 418 a determination is made whether a global notification service connection message timer expired. According to one embodiment of the invention, the mobile device transmits a notification service connection message to each notification service at approximately the same time (e.g., within a minute of each other) at a periodic interval (e.g., 4 times a day). If the global notification service connection message timer expires, then flow moves to block 426 where a determination is made whether the mobile device is awake. If the mobile device is awake, then flow moves to block 430 where the mobile device transmits a notification service connection message to each notification service. If the mobile device is not awake, then flow moves to block 428 where the mobile device is awakened and flow moves to block 430 where the mobile device transmits a notification service connection message to each notification service.

Since multiple mobile devices may be accessing the same notification services through the same network (e.g., with reference to FIG. 1, according to one embodiment of the invention the mobile device 160 and the mobile device(s) 170 are at least partially coupled with the same network access data element(s) 150), the global notification service connection message timer is configured so that all of the mobile devices do not transmit a notification service connection message at the same time. According to one embodiment of the invention, these notification service connection message transmission times are cryptographically randomized (and thus spread throughout the day). For example, a unique identifier of each mobile device (e.g., a universally unique identifier (UUID), a Media Access Control (MAC) address, etc.) modded over a given time interval to determine these global notification service connection message transmission times.

Figure 6:
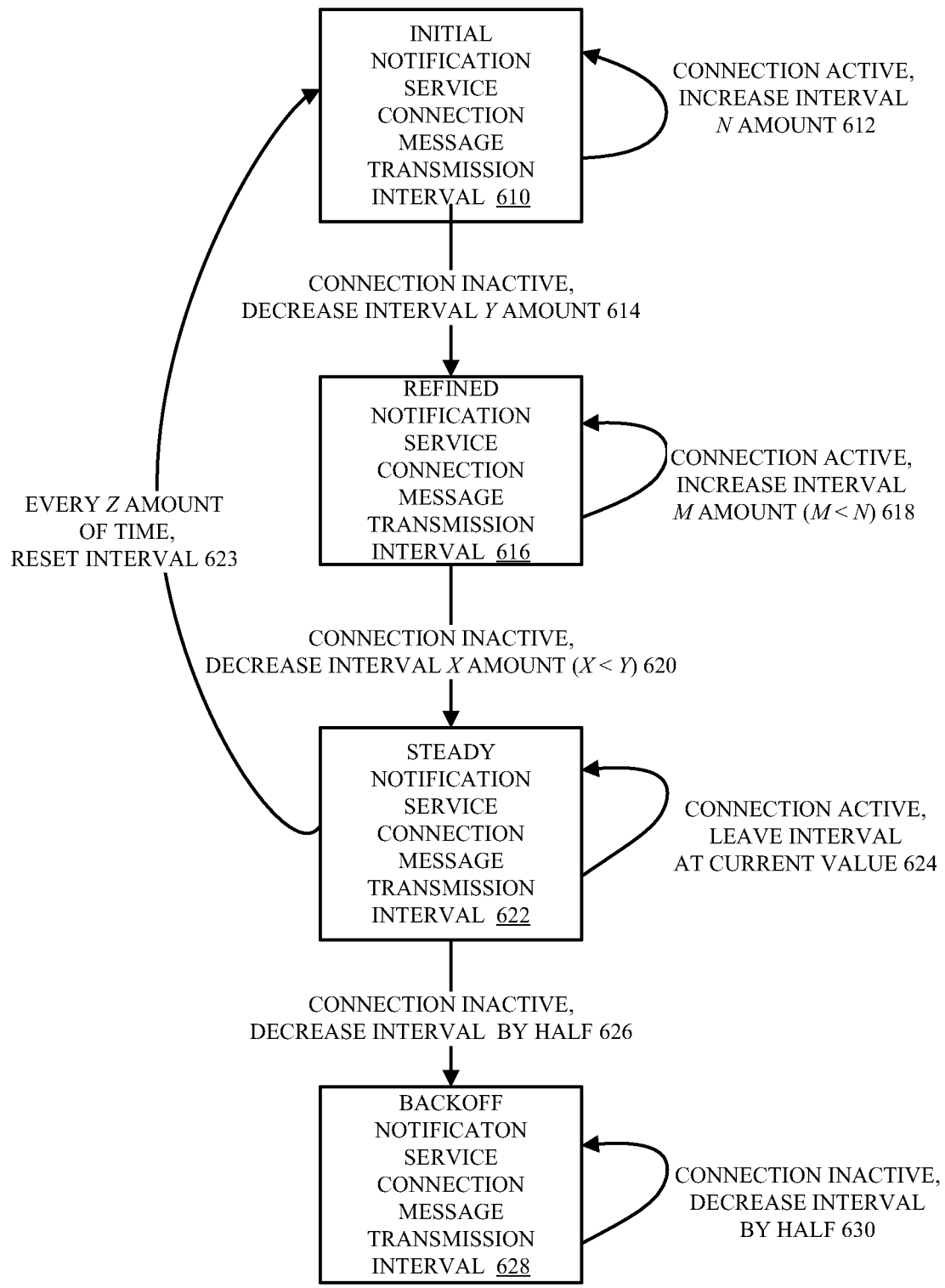
FIG. 6 is an exemplary state diagram illustrating optimizing notification service connection message intervals according to one embodiment of the invention.

As described previously, in some embodiments of the invention, the notification service connection message transmission interval for persistent notification services (e.g., push notification services) may be optimized. In other words, in some embodiments of the invention, the message transmission interval is optimized in order to transmit the least amount of notification service connection messages for persistent notification services while remaining connected to the persistent notification services. FIG. 6 is an exemplary state diagram illustrating optimizing notification service connection message intervals according to one embodiment of the invention. At block 610, an initial notification service connection message transmission interval is determined. For example, the initial notification service connection message transmission interval may be based on a timeout interval of a particular notification service. If the mobile device determines that the connection is active, the message transmission interval is increased by N amount 612 (e.g., 5 minutes). For example, the connection may be determined to be active if a reply message is received from the notification service.

If the mobile device determines that the connection is not active, the message transmission interval is decreased by Y amount 614 (e.g., 5 minutes), and enters a refined notification service connection message transmission interval 616. If the mobile device determines that the connection is active, then the message transmission interval is increased by M amount, where M is less than N 618 (e.g., 2 minutes). If the mobile device determines that the connection is not active, then the message transmission interval is decreased by X amount, where X is less than Y 620.

After some time, connection message transmission interval enters into the steady notification service connection message transmission interval 622 state. When in this state, if the connection is active, the interval value remains at the current value 624. In some embodiments of the invention, after a Z amount of time in the state 622 (e.g., after 8 hours), the connection message transmission interval is reset 623 to the initial notification service connection message transmission interval 610, where the interval optimization process restarts. Thus, if the notification service connection message transmission interval settles into a relatively high frequency message transmission interval (e.g., a message every 5 minutes), after some period of time the optimization process restarts in an attempt to determine the optimum transmission interval. However, if the connection is not active, the interval is decreased 626 (e.g., decreased by half), and the interval enters the backoff notification service connection message transmission interval 628. When in the backoff state, if the connection is not active, the interval is decreased 630 (e.g., decreased by half).

It should be understood that if a notification service connection is not active, that connection needs to be reestablished. According to one embodiment of the invention, notification service connection retries are scheduled according to wake intervals. For example, with reference to FIG. 5, if the beat 572 failed to refresh the connection to the push notification service 110 at time 25, in one embodiment of the invention, the next wake the mobile device will attempt to reestablish the notification service connection. Thus, during the wake 564 at time 40, the mobile device may attempt to reestablish the notification service connection to the push notification service 110.

Proxy-Based Notification Service

As described above, the notification services provide a user an experience of acquiring up-to-date information at the expense of battery life of a mobile client. In addition, the user may also need to pay for data associated with the protocol overhead, which may be nontrivial if the user does not have an unlimited data plan. The mobile client needs to periodically send notification service connection messages to maintain the data link, no matter there is actual user data activity or not. As a result, the mobile client needs to wake up from sleep periodically to send notification service connection message; in addition, the responses from the server would also wake up the mobile device and hence consumes more battery power. Power consumption of the battery increases when the user chooses an aggressive push interval, or when the user subscribes for multiple push services.

For example, a typical heartbeat interval is in the range from 8 to 28 minutes for Microsoft Exchange server. Even if the user receives no data, at 8 minute intervals, the mobile device would need to wake up 180 times per day to send notification service connection message s; and again it would also roughly need to wake up another 180 times per day to process the corresponding server responses since the server response is usually delayed for an interval per server configuration. The situation would be worse if the user subscribes for multiple push services or if the user chooses an aggressive push interval. Furthermore, for users who pay data service by bytes, the push notification service connection messages may also incur a cost for the user. Assuming an average payload of 200 bytes per packet and interval of 8 minutes, the overhead is about 2 MB per month. And this number increases linearly with the number of push services that the user subscribes to.

In one embodiment, a proxy is used to alleviate the demand on the battery life of a mobile client and additional data cost associated with notification. In this embodiment, this proxy is used to manage the notification services for a mobile client. The proxy may manage one or more services for a mobile client and/or may handle notification service(s) for one or more clients. To manage the notification service connections, the proxy would receive a request from the mobile client to proxy for the mobile client for one or more notification services, periodically send a notification service connection messages to the corresponding notification server, forward notifications form the mobile client, handle updates form the mobile client, and handle mobile client sign out requests.

In one embodiment, the proxy is a stand alone device, such as a personal computer, laptop, server, mobile client, etc. For example and in one embodiment, the proxy is a stand alone device with a separate power supply and, optionally, a low cost data connection. In another embodiment, the proxy is part of the mobile client. In this embodiment, the mobile client includes an application processor running a first operating system and one or more network connectivity elements that run one or more different operating systems. In addition, the power consumption of the application processor can be larger than the power consumption of the network connectivity elements. Furthermore, one or more of the network connectivity elements executes the proxy in the corresponding operating system of those network connectivity elements. By executing the proxy in the network connectivity element, the application processor can enter a sleep mode, and save battery life for the mobile client.

Figure 9A:
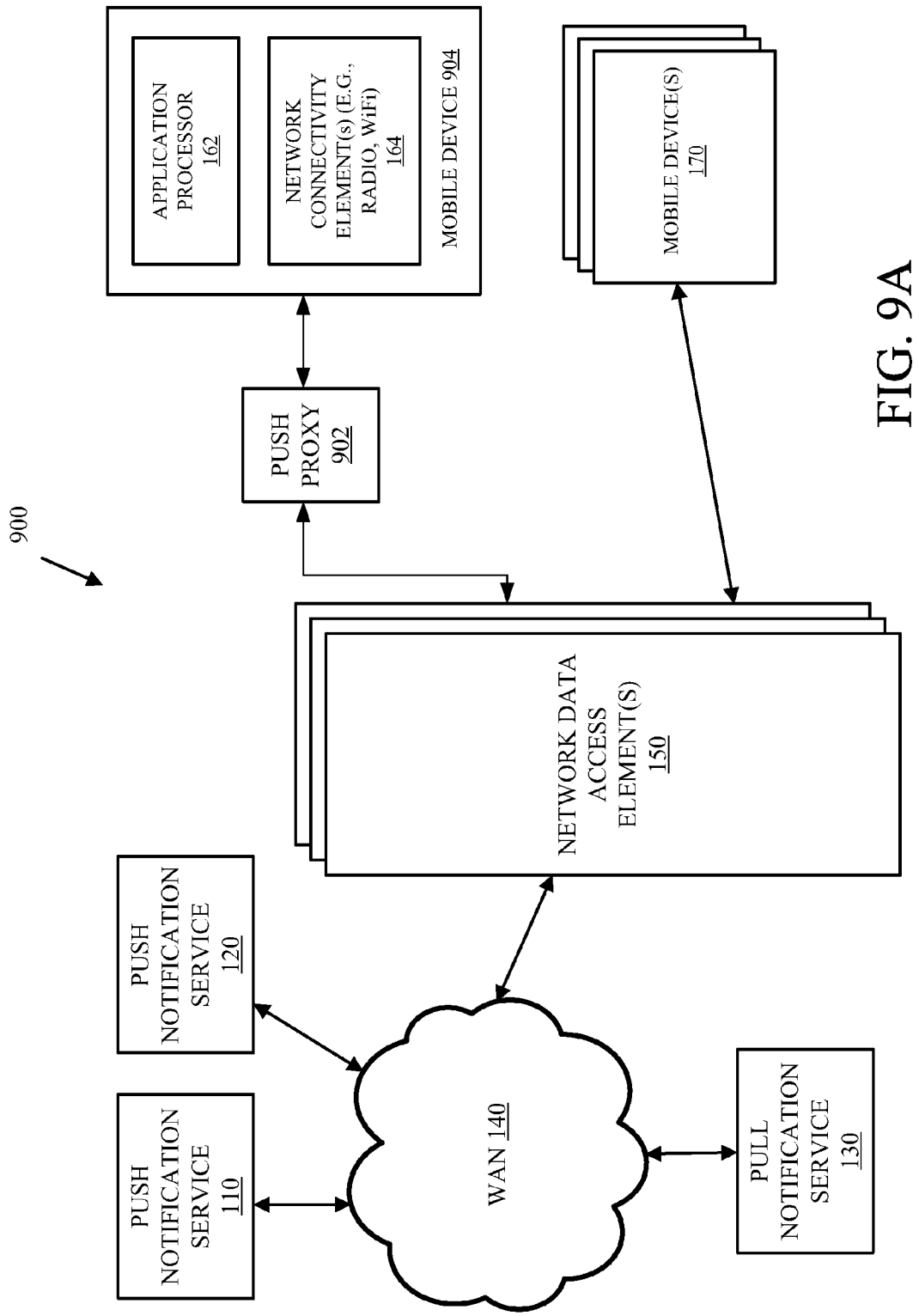
FIG. 9A illustrates an exemplary computing environment that includes a stand-alone proxy according to one embodiment of the invention.

FIG. 9A illustrates an exemplary computing environment 900 that includes a stand-alone proxy according to one embodiment of the invention. The computing environment 900 is similar to the computing environment 100 of FIG. 1 above, in which the computing environment 900 includes the mobile devices 904 and 170 that are each coupled with one or more network data access elements 150. As in FIG. 1, the network data access element(s) 150 may be part of various types of networks in different embodiments of the invention, including cellular networks (e.g., GSM, EDGE, GPRS, CDMA, UMTS, TD-CDMA, LTE, or other cellular networks), LANs, etc. However, unlike computing environment 100, in computing environment 900, mobile device 904 uses a proxy 902 to management the service connection(s) for the mobile device 904. In one embodiment, the proxy 902 transmits notification service connection messages and receives responses as though the proxy 902 was the mobile client 904 performing this function. The proxy 902 is further described below.

The mobile device 904 includes the application processor 162 and the network connectivity element(s) 164 as described above in FIG. 1. The mobile device 160 communicates with the network data access element(s) 150 via the network connectivity element(s) 164 and proxy 902, through a data context (e.g., a PDP context). Furthermore, the WAN 140 is coupled with the network data access elements 150. The push notification services 110 and 120 and the pull notification service 130 are coupled with the WAN 140. According to one embodiment of the invention, a user of the mobile device 902, via proxy 904, accesses and uses the push notification services 110 and 120 and the pull notification service 130 (the push notification services 110 and 120 and the pull notification service 130 provide items of interest for the user). For example, the push notification service 110 may be providing a personal push email account for the user of the mobile device 902, via proxy 904, while the push notification service 120 may be providing a work push email account for the user of the mobile device 160.

In one embodiment of the invention, the application processor 162 is the central processor of the mobile device 902. In one embodiment, the application processor 162 processes the operating system(s) of the mobile device 902 as described in FIG. 1.

According to one embodiment of the invention, the mobile device 902 is capable of entering into a sleep mode as described FIG. 1 for mobile client 160. In addition, by using the proxy 902, mobile client 904 can be in the sleep mode while the proxy manages the service connection(s) for the mobile 904. During sleep mode, according to one embodiment of the invention, the mobile device 902 temporarily disables the application processor 162 (the application processor 162 may consume virtually no power when temporarily disabled).

As is described in FIG. 1, the persistent notification service connections (e.g., push notification services 110 and 120) are periodically refreshed in order to maintain the persistency of the connections in some embodiments of the invention. Instead of a mobile client periodically refreshing the persistent notification service connection(s) as described in FIG. 1, proxy 902 refreshes these persistent notification service connection(s) for the mobile clients. For example, the push notification services 110 and 120 may timeout a connection to the mobile device 904 (thus stopping push notification services for the user) if the mobile device 904 does not actively use that connection. However, in this embodiment, proxy 902 actively uses this connection for the mobile client 904. In one embodiment, at some periodic interval, the proxy 902 transmits a notification service connection message to the push notification services 110 and 120 to refresh the connections for the mobile client 904. During the time the proxy 902 manages the notification service connection for the mobile client 904, the mobile client 904 may enter a sleep mode, thereby saving battery power for the mobile client 904. The notification service connection message informs the push notification services 110 and 120 that the proxy 902 is still connected (and presumably wishes to continue to receive items of interest from the push notification services). It should be understood that refreshing the push notification connections, by the proxy 902, informs the push notification service's servers that the mobile device wishes to remain connected to the service. In addition, refreshing the push notification connections informs each network element along the route to the push notification service's servers to maintain the connection (otherwise, e.g., a network element may clear the network resources associated with that connection). In one embodiment, the notification service connection message may be a ping message, hypertext transport protocol (HTTP) request, or some other keep alive message as known in the art. The notification services may respond to a notification service connection message to notify the proxy 902 that the connection is active for the mobile device 902. It should be understood that in some embodiments of the invention, receipt of an item of interest from a notification service also refreshes the persistent notification service connection.

As described above, the interval of transmitting a notification service connection message may be different for individual notification services. In addition, in some embodiments of the invention, the mobile device 904 is required to periodically refresh the connection with the network data access element(s) 150 in order to maintain network data connectivity (e.g. such as NAT routers in the carrier's network, firewalls, or other network elements in the network). In this embodiment, by managing the notification service connection(s) for the mobile client 904, proxy 902 will refresh these network data access element(s) 150 connections.

In one embodiment, proxy 902 manages notification services and mobile clients updates. For example and in one embodiment, proxy 902 receives the service connection requests from the mobile client 904, forwards these service connection requests to the corresponding service provider (e.g., push notification services 110 and 120, etc.). In addition, proxy 902 manages the service connection(s) for the mobile client 904. For example and in one embodiment, proxy 902 transmits a notification service connection message to the push notification services 110 and 120 to refresh the connection(s) for the mobile client 904. As described above, this notification service connection message can be a ping message, HTTP request, or some other keep alive message as known in the art.

If a notification message is received by the proxy 902 (whether in response to the notification service connection message or pushed to the proxy by one of the notification servers, etc.), proxy 902 can forward the notification message to application processor 162 of the mobile client 904, or can hold onto the notification message so as to bundle this notification message with other notification messages and send the bundled messages at a later time. In addition, the proxy 902 manages updates from the mobile client 904, such as sign in/out requests, address changes, etc. In one embodiment, proxy 902 manages updates received from the application processor 162 of the mobile client 904. The proxy functions are described further in FIGS. 10-13 below.

Figure 9B:
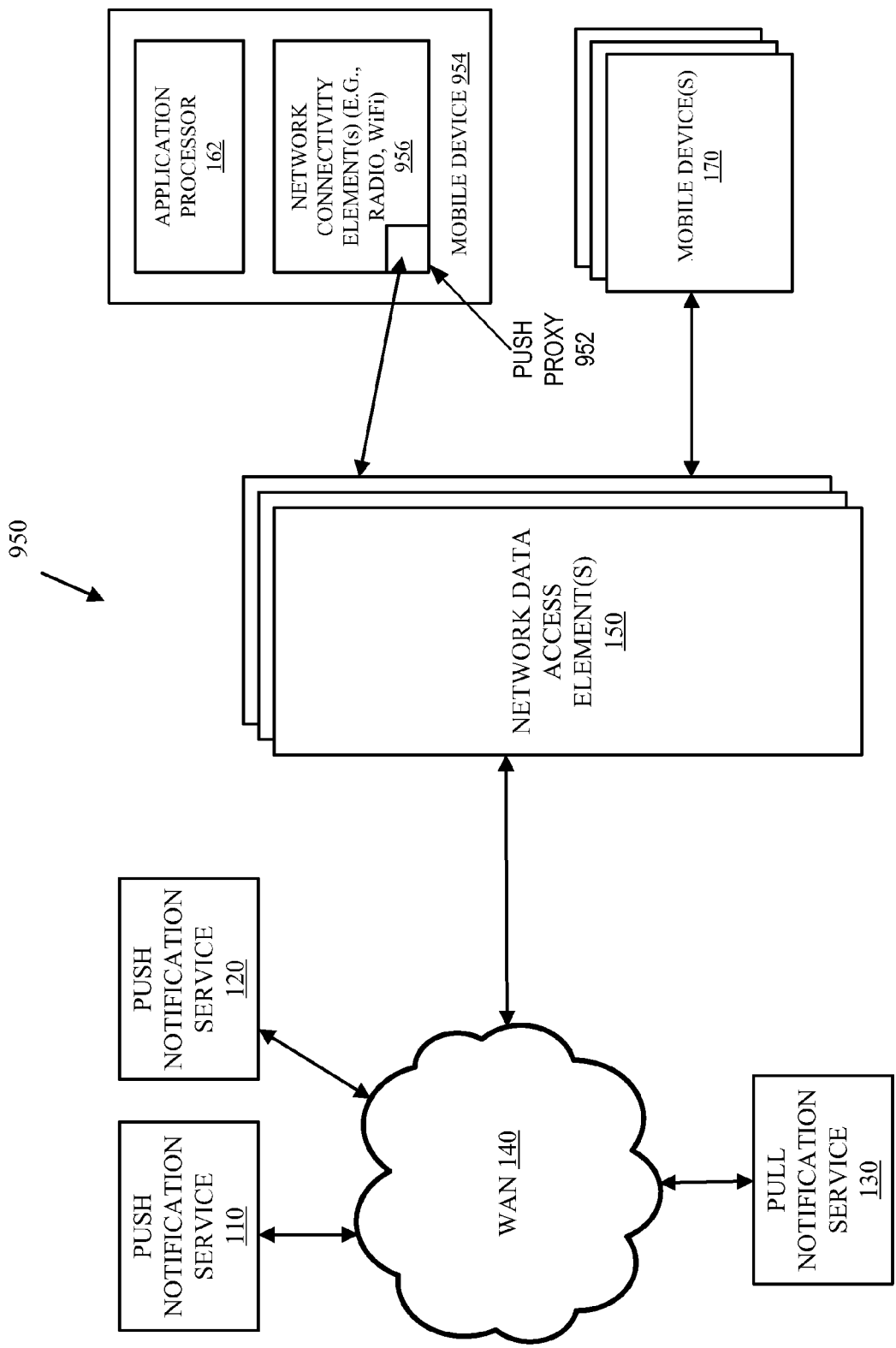
FIG. 9B illustrates an exemplary computing environment that includes a proxy incorporated into a mobile client according to one embodiment of the invention.

As described above, the proxy can be a stand-alone device, such as proxy 902, or be incorporated into the mobile client. FIG. 9B illustrates an exemplary computing environment 950 that includes a proxy 952 incorporated into a mobile client 954 according to one embodiment of the invention. In FIG. 9B, the proxy 952 is incorporated as part of the mobile client 954. In one embodiment, proxy 952 is part of the network connectivity element(s) 956. In this embodiment, the proxy 952 runs under an operating system of the network connectivity element(s) 956 which allows the application processor to enter a low power or "sleep mode" so as to conserver power consumption of the mobile client 954. For example and in one embodiment, proxy 902 runs under the operating system of a 3G cellular network connectivity element that is used to operate a 3G cellular network connection. In this example, the operating system of this network connectivity element can be software, firmware, hardware, etc.

In one embodiment, the proxy can be part of the operating environment of the baseband processor of the network connectivity element(s) 956, which allows the mobile client 954 to avoid waking up the application processor 162 and save battery. In this embodiment, proxy 952 takes over majority of the protocol overhead associated with the notification service(s), and the application processor 162 of the mobile client 954 is notified when data is available.

In one embodiment, proxy 952 performs similar functions as proxy 902 as described in FIG. 9A above. For example and in one embodiment, proxy 952 receives the service connection requests from the application processor 162, forwards these service connection requests to the corresponding service provider (e.g., push notification services 110 and 120, etc.). In addition, proxy 952 manages the service connection(s) for the mobile client 954. For example and in one embodiment, proxy 952 transmits a notification service connection message to the push notification services 110 and 120 to refresh the connection(s) for the mobile client 954. As described above, this notification service connection message can be a ping message, HTTP request, or some other keep alive message as known in the art.

If a notification message is received by the proxy 952 (whether in response to the notification service connection message or pushed to the proxy by one of the notification servers, etc.), proxy 952 can forward the notification message to application processor 162 of the mobile client 954, or can hold onto the notification message so as to bundle this notification message with other notification messages and send the bundled messages at a later time. In addition, the proxy 952 manages updates from the mobile client 954, such as sign in/out requests, address changes, etc. In one embodiment, proxy 952 manages updates received from the application processor 162 of the mobile client 954. The proxy functions are described further in FIGS. 10-13 below.

Figure 10:
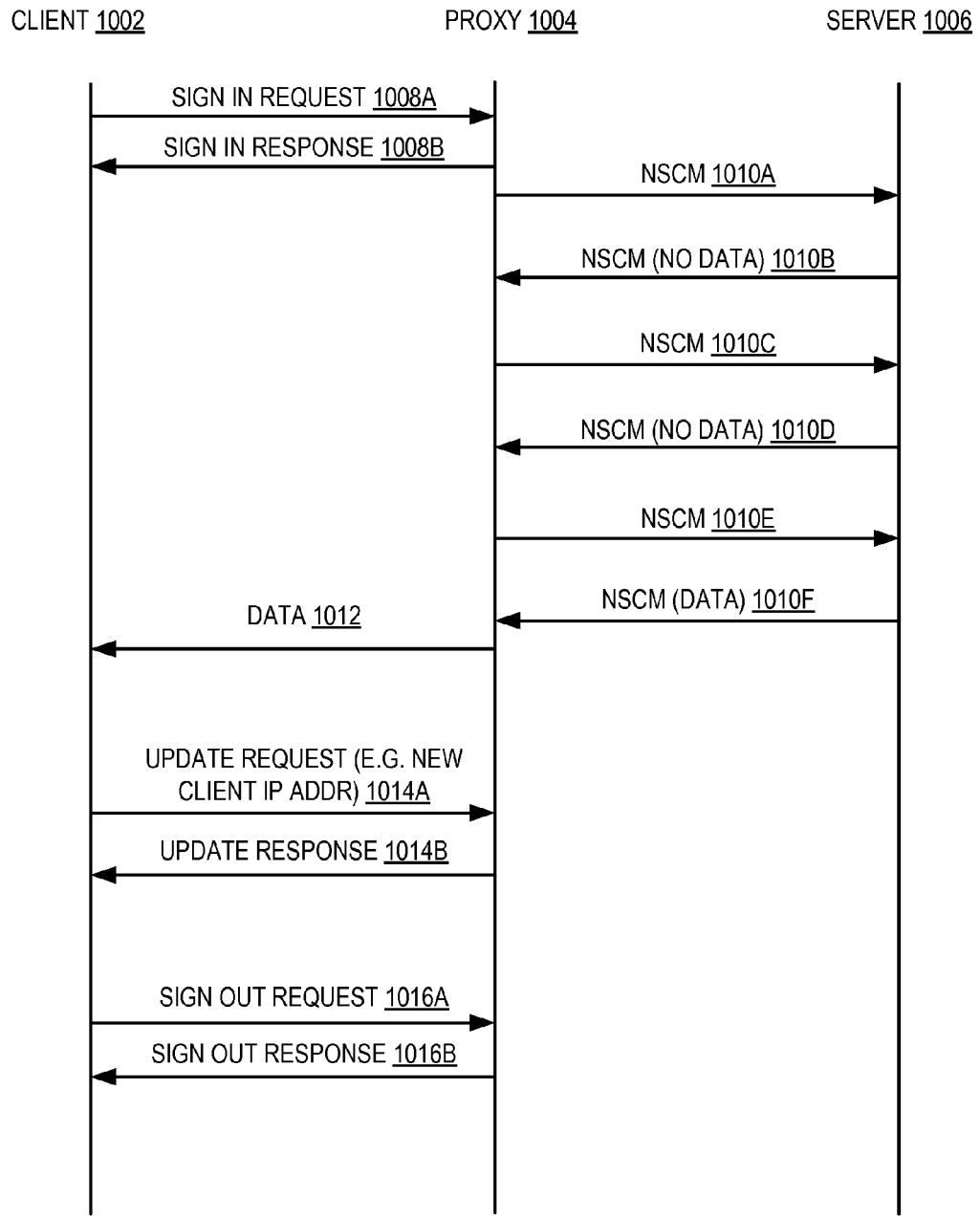
FIG. 10 is a block diagram of a proxy that proxies service connection(s) between a client and a server according to one embodiment of the invention.

FIG. 10 is a block diagram of a proxy that proxies service connection(s) between a client and a server according to one embodiment of the invention. In FIG. 10, the client 1002 communicates with the proxy 1004 and the proxy 1004 communicates with the server 1006. In one embodiment, client 1002 can be mobile client 904 or 954 as described above. In another embodiment, proxy 1004 can be the proxy 902 or 952 as described above. In a further embodiment, server is one of the push notification services 110 or 120 as described above.

In FIG. 10, the client 1002 transmits a sign in request (1008A) to the proxy 1004. In one embodiment, the client 1002 sends the sign in request when a user of the client 1002 turns on the push service or when the client is started up (e.g. device powers up). In one embodiment, the sign in request includes information that can be used to establish the proxy (e.g., client identification, client IP address, server IP address, transaction identifier, Quality of Service (QoS) parameters, maximize battery, etc.). In one embodiment, the client identification is an identification that uniquely identifies the client (e.g., International mobile equipment identity (IMEI), MAC address, etc.). In one embodiment, the client IP address is the IP address of the client 1002 and the proxy uses this IP address to send data to the client. The server IP address is the IP address of the server for the corresponding notification services. In one embodiment, the sign in request includes one or more requests for the notification services. In this embodiment, the sign in requests would more than one server IP address.

In addition the sign in request may also include QoS parameters, such as delay. In this embodiment, the delay is a parameter that indicates what sort of delay that a user may tolerate. Furthermore, the sign in request may additionally include a parameter to indicate whether or not the user would like to maximize battery life.

In response to receiving the sign in request, the proxy echoes back a transaction identifier and sends a sign in response (1008B) to the client 1002. In one embodiment, the sign in response includes the client identification, the client IP address, and the transaction identifier. In one embodiment, the transaction identifier is an identifier that identifies the proxy session with the client.

With the information from the sign in request, the proxy 1004 sends notification service connection message to the server 1006 to refresh the connection(s) for the client 1002 (1010A-F). For example, the proxy 1004 periodically sends out a notification service connection message (1010A, 1010C, and 1010E) to the server 1006. In one embodiment, the notification service connection message is a ping message, HTTP request, or some other keep alive message as known in the art. In response, the server 1006 can respond with a response that includes no data in the payload (1010B and 1010D) or with data in the payload (1010F). In one embodiment, a response with no data indicates that there are no notification messages for the client 1002. If there is no data, the proxy 1004 does not notify the client and does not potentially wake the client 1002 from a sleep mode, thereby saving battery power.

In one embodiment, a response with data is a response that includes one or more notification messages for the client 1002. In one embodiment and in response to receiving a response with data, the proxy 1004 sends the data onto the client 1002 (1012). In this embodiment, the proxy 1004 sends the one or more notification messages to the client 1002. Furthermore, if the client 1002 is in a sleep mode, receipt of the one or more notification messages would wake the client 1002 from the sleep mode so that the client 1002 can process the one or more notification messages.

In one embodiment, the proxy 1004 can forward the one or more notification messages to the client 1002 upon receipt of the response with data from the server 1006. In an alternative embodiment, the proxy 1004 can bundle the one or more notification messages with other notification messages and send the bundled notification messages to the client 1002. In this embodiment, the bundling of notification messages could save battery life of the client because the number of times that notification messages are forwarded to the client 1002 is reduced.

In one embodiment, whether the proxy 1004 forwards the notification message upon receipt or bundle the notification messages is controlled by parameters sent by the client 1002 in the sign in request (1008A) described above. For example and in one embodiment, the proxy 1004 would use battery life parameter to determine whether to bundle the notification messages for a client. In an alternative embodiment, whether to bundle or not can be updated from the client, based on time of day, timeliness of service, etc.

In addition, the client 1002 may send an update request (1014A). In one embodiment, the update request includes a request to update the client IP address, due to an IP address change of the client 1002. In this embodiment, the update request includes the client identification, the new client IP address, and the transaction identifier. A client IP address may change if the network has deactivated the data context due to client inactivity and the client reestablished the data context or if the client has changed networks (e.g., cellular to Wi-Fi and visa versa). The client 1002 may also send an update request to the proxy if the client has been out of service for a certain period, so that the proxy can push data available to the client. In this embodiment, this new IP address is saved by the proxy 1004 and replacing the client's old IP address.

In another embodiment, the client 1002 sends an update request to change some or all of the parameters (QoS parameters, battery parameters, etc.). In one embodiment, a user may want to maximize the battery conservation and change notification forwarding from forwarding the notification message upon receipt to bundling the notification messages. In an alternate embodiment, the user may want to change notification forwarding to forwarding the notification message upon receipt. In a further embodiment, the update is for other reasons (time of day, location of mobile client, etc.).

In one embodiment, if the user turns off a push service or when the device powers down, the client 1002 may send a sign out request to the proxy (1016A). In one embodiment, the sign out request is a packet that includes information indicating that the proxy service is to be stopped. In one embodiment, the sign out request include the client identification and transaction identifier. The proxy may stop communicating with the server or it may continue the communication and buffer data for later use. Upon receipt of the sign out request, the proxy 1004 sends a sign out response to the client 1002 (1016B).

Figure 11:
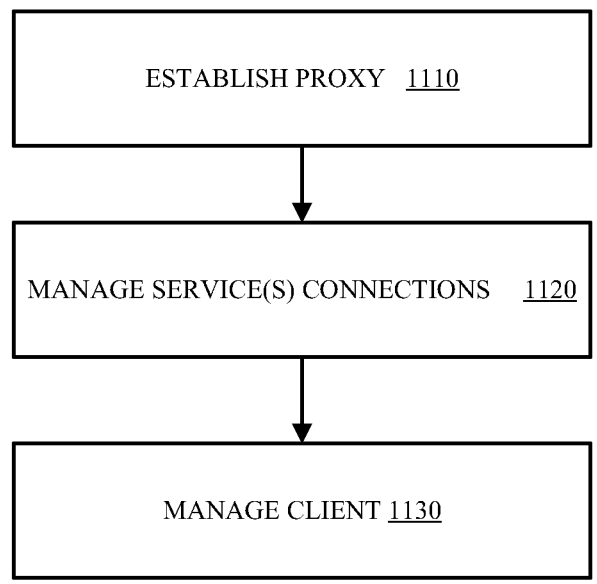
FIG. 11 is a flow diagram illustrating managing notification service connections by a proxy for a client according to one embodiment of the invention.

FIG. 11 is a flow diagram illustrating managing notification service connections by a proxy for a client according to one embodiment of the invention. In one embodiment, the proxy 902 or 952 performs process 1100 to manage notification service connections. In FIG. 11, process 1100 begins by establishing the proxy at block 1110. In one embodiment, process 1100 establishes the proxy by receiving a sign in request and responding to that sign in request as described in FIG. 10 above.

At block 1120, process 1100 manages the service connection(s). In one embodiment, process 1100 manages the service connections by periodically sending notification service connection messages to the corresponding server and processing the responses to those notification service connection messages. Furthermore, process 1100 forwards notifications to the client. Managing the service connection(s) is further described in FIG. 12 below.

Process 1100 manages the client at block 1130. In one embodiment, process 1100 manages the client by receiving and responding to sign in and/or sign out requests. Managing a client is further described in FIG. 13 below.

Figure 12:
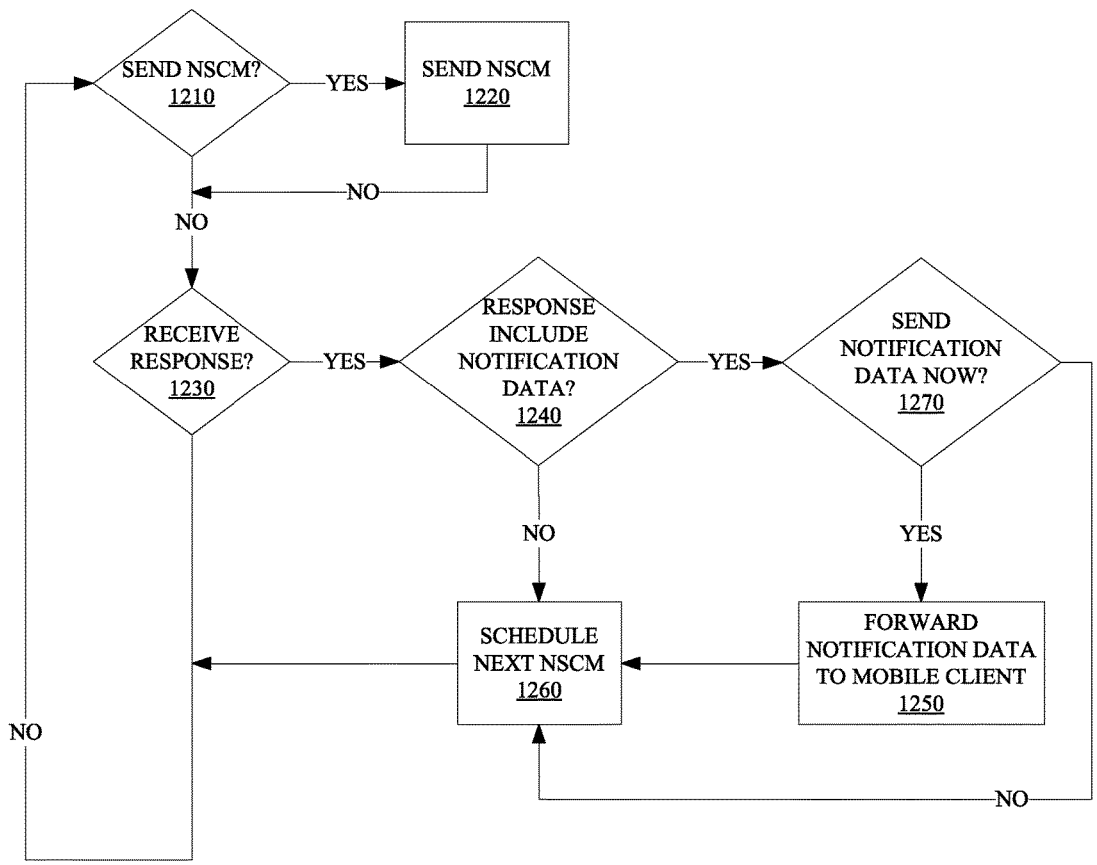
FIG. 12 is a flow diagram illustrating managing notification service connections between a proxy and a server according to one embodiment of the invention.

FIG. 12 is a flow diagram illustrating managing notification service connections between a proxy and a server according to one embodiment of the invention. In one embodiment, the proxy 902 or 952 performs process 1200 to manage notification service connections between a proxy and a server. In FIG. 12, process 1200 begins by determining if process 1200 should send a notification service connection message to the server at block 1210. In one embodiment, process 1200 sends the notification service connection message on a periodic basis, based on a dynamically adjusted interval, etc. If the process 1200 is to send the notification service connection message, process 1200 sends the notification service connection message at block 1220. In one embodiment, process 1200 sends an appropriate message to the server, such as a ping message, HTTP request, or some other keep alive message as known in the art. Execution proceeds to block 1230. If the process 1200 determines that it is not to send the notification service connection message at block 1210, execution proceeds to block 1230 below.

At block 1230, process 1200 determines if the process 1200 has received a response from the server. In one embodiment, the received response is for client that process 1200 is proxying for. If the process has received a server response, at block 1240, the process 1200 determines if the received service response includes notification data for the client, process 1200 determines if the notification data is to be sent to the client or bundled for later sending at block 1270. In one embodiment, process 1200 may selectively forward notifications to the client. For example, process 1200 may bundle notifications to reduce the number of times to wake up the client so as to reduce battery consumption. As another example, the mobile device is without data service (e.g. due to roaming) and the process 1200 would receive notifications on behalf of the client and selectively notify the mobile with another transportation mechanism (e.g. short message service (SMS)). In another example, process 1200 may selectively forward notifications based on the content of the notification data (e.g., time sensitive notifications are forwarded upon receipt (e.g., stock notifications, etc.) and non-time sensitive notifications are bundled (e.g., application updates, etc.)). If the notification data is to be sent, say for example, the proxy service forwards the notification data upon receipt or if the enough notification data has been bundled, process 1200 forwards the notification data to the client at block 1250. In one embodiment, process 1200 forwards the notification data upon receipt to the client or bundles the notification data with other notifications as descried above in FIG. 10. Execution proceeds to block 1260 below. If the notification is not to be sent, process 1200 buffers the notification data to be bundled with other notification data and execution proceeds to bock 1260 below.

If process 1200 received a response that did not include notification data, at block 1260, process 1200 schedules the next notification service connection message to send. In one embodiment, process 1200 schedules the next notification based on a periodic period, a dynamically adjusted period, etc. Execution proceeds to block 1210 as described above.

Figure 13:
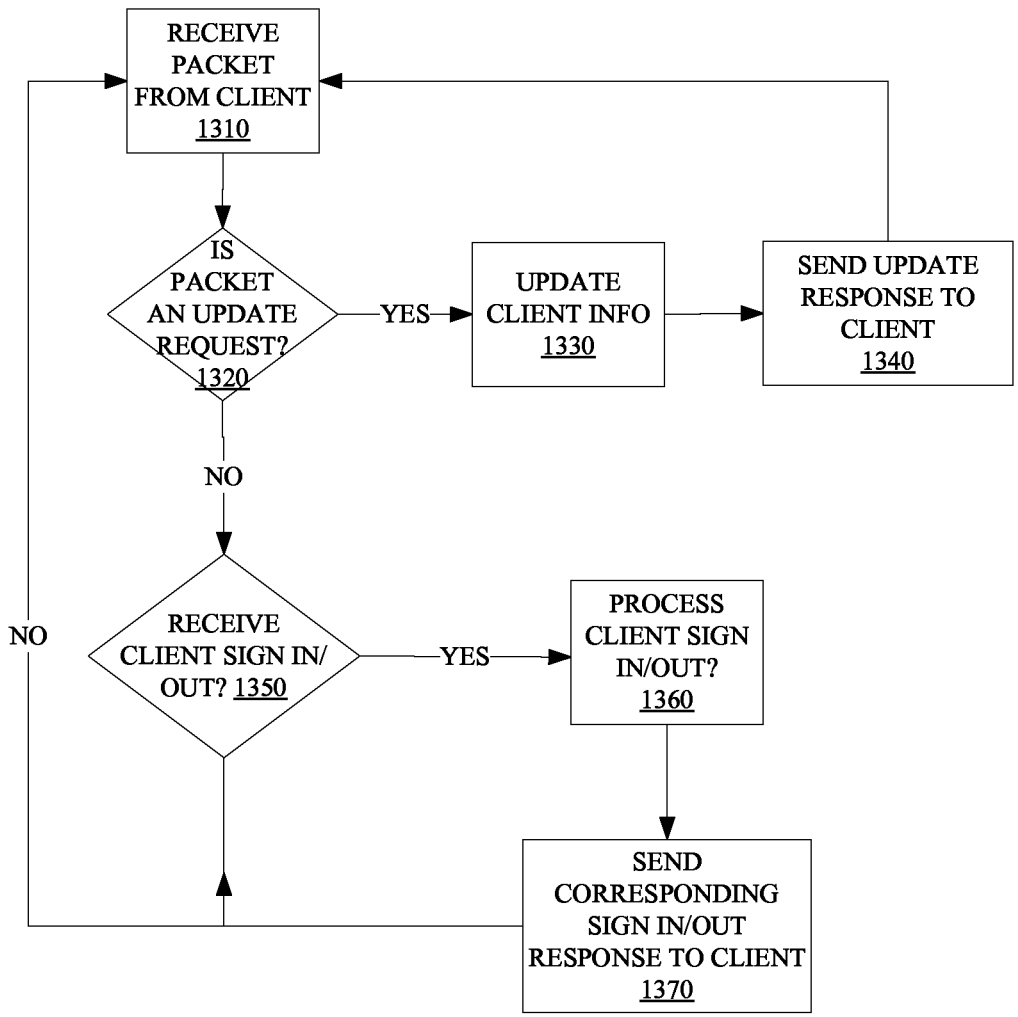
FIG. 13 is a flow diagram illustrating managing client interactions according to one embodiment of the invention.

FIG. 13 is a flow diagram illustrating managing client interactions according to one embodiment of the invention. In one embodiment, the proxy 902 or 952 performs process 1300 to manage the client. In FIG. 13, process 1300 begins by receiving a packet from the client at block 1310. In one embodiment, the received packet can be a sign in request, sign out request, update request, etc.

At block 1320, process 1300 determines if the received packet was an update packet. As described above, an update packet is a packet from the client that requests an update to the proxy service. For example and in one embodiment, an update request packet can request to update a client IP address or other parameters associated with the proxy service (e.g. QoS parameters, battery usage parameters, etc.). If the received packet was an update request packet, at block 1320, process 1300 updates the client information using the information included in the update request packet. For example and in one embodiment, if the update request packet includes a request to update a client IP address, process 1300 updates the client IP address information as described above in FIG. 10. As another example and another embodiment, if the update request packet includes a request to update some other proxy setting (e.g., QoS parameters, battery settings, etc.), process 1300 updates these settings as described above in FIG. 10. At block 1340, process 1300 sends an update response to the client. In one embodiment, includes information that acknowledges the requested update.

If the received packet is not an update packet, process 1300 determines if the received packet is a sign in or sign out packet at block 1350. In one embodiment, a sign in request is a packet that includes information that can be used to establish the proxy (e.g., client identification, client IP address, server IP address, QoS parameters, maximize battery, etc.). In one embodiment, the sign out request is a packet that includes information indicating that the proxy service is to be stopped as described above in FIG. 10.

At block 1360, process 1300 processes the received sign in/sign out request. In one embodiment, if the received packet is a sign in request, process 1300 establishes a proxy for the client using the information included in the sign in request. In one embodiment, if the received packet is a sign out request, the process 1300 stops the proxy service using the information included in the sign out request. In another embodiment, the sign out request includes a request for the proxy service to continue to perform the proxy functionality by sending keep alive messages and buffer received response. For example and in one embodiment, the client powers off or turns off data feature (e.g. to reduce cost when roaming) and the client sends a sends out the sign out request, the client may request that process 1300 to continue receiving push messages and buffer them. In addition and in this embodiment, the process 1300 may have logic to send a SMS message to the client to notify the user about certain messages for services designated by the client.

Process sends a corresponding sign in/sign out response to the client at block 1370. In one embodiment, process sends the corresponding request as described above in FIG. 10. Execution proceeds to block 1310 above.

Figure 7:
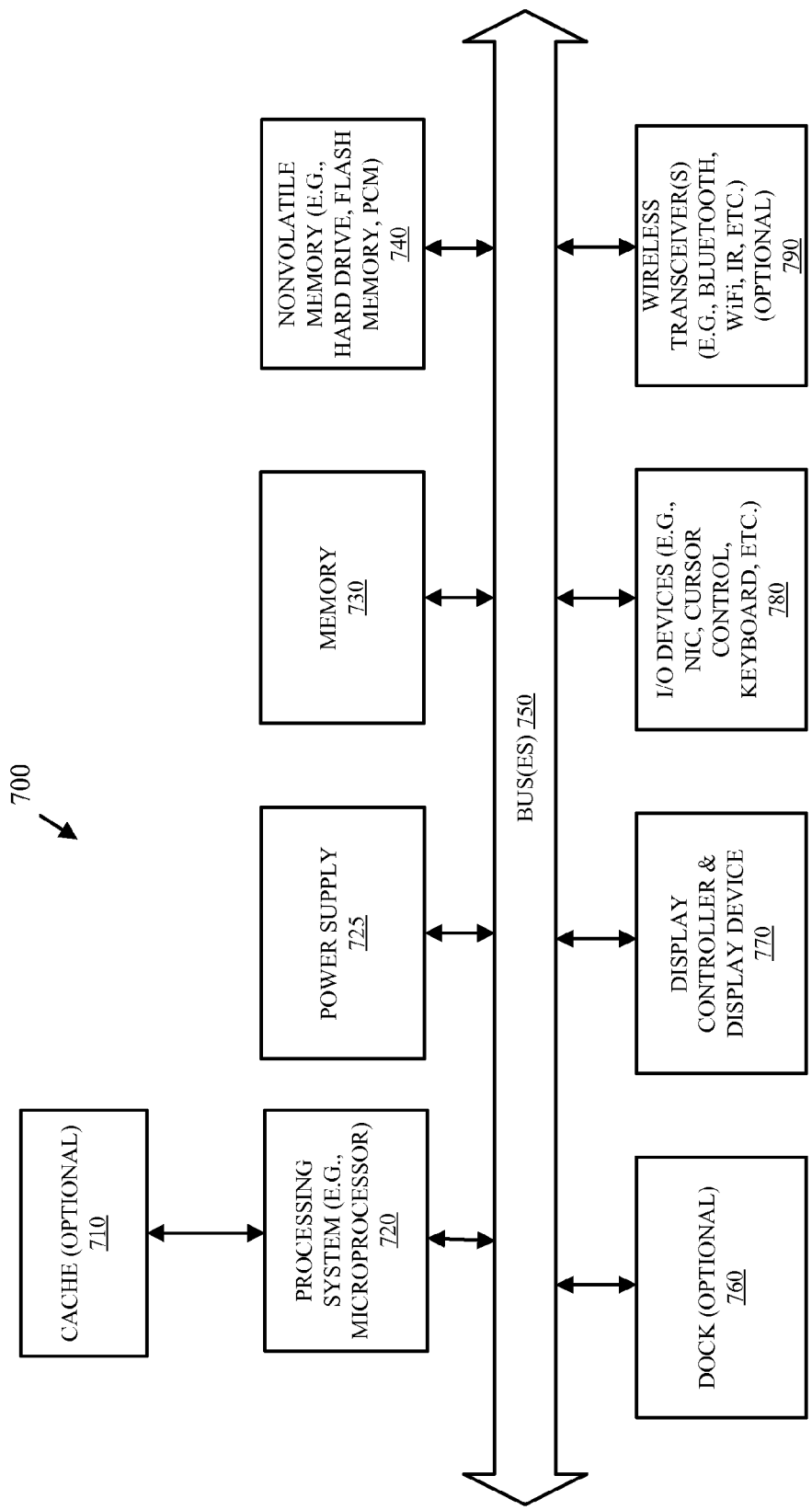
FIG. 7 is a block diagram illustrating an exemplary mobile device according to one embodiment of the invention.

FIG. 7 is a block diagram illustrating an exemplary computer system, which may be used in some embodiments of the invention. For example, the exemplary architecture of the computer system 700 may be included in a mobile device (e.g., mobile devices 160, 904, or 954). It should be understood that while FIG. 7 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 7, the computer system 700, which is a form of a data processing system, includes the bus(es) 750 which is coupled with the processing system 720, power supply 725, memory 730, and the nonvolatile memory 740 (e.g., a hard drive, flash memory, Phase-Change Memory (PCM), etc.). The bus(es) 750 may be connected to each other through various bridges, controllers, and/or adapters as is well known in the art. The processing system 720 may retrieve instruction(s) from the memory 730 and/or the nonvolatile memory 740, and execute the instructions to perform operations as described above. The bus 750 interconnects the above components together and also interconnects those components to the optional dock 760, the display controller & display device 770, Input/Output devices 780 (e.g., NIC (Network Interface Card), a cursor control (e.g., mouse, touchscreen, touchpad, etc.), a keyboard, etc.), and the optional wireless transceiver(s) 790 (e.g., Bluetooth, WiFi, Infrared, etc.).

Figure 8:
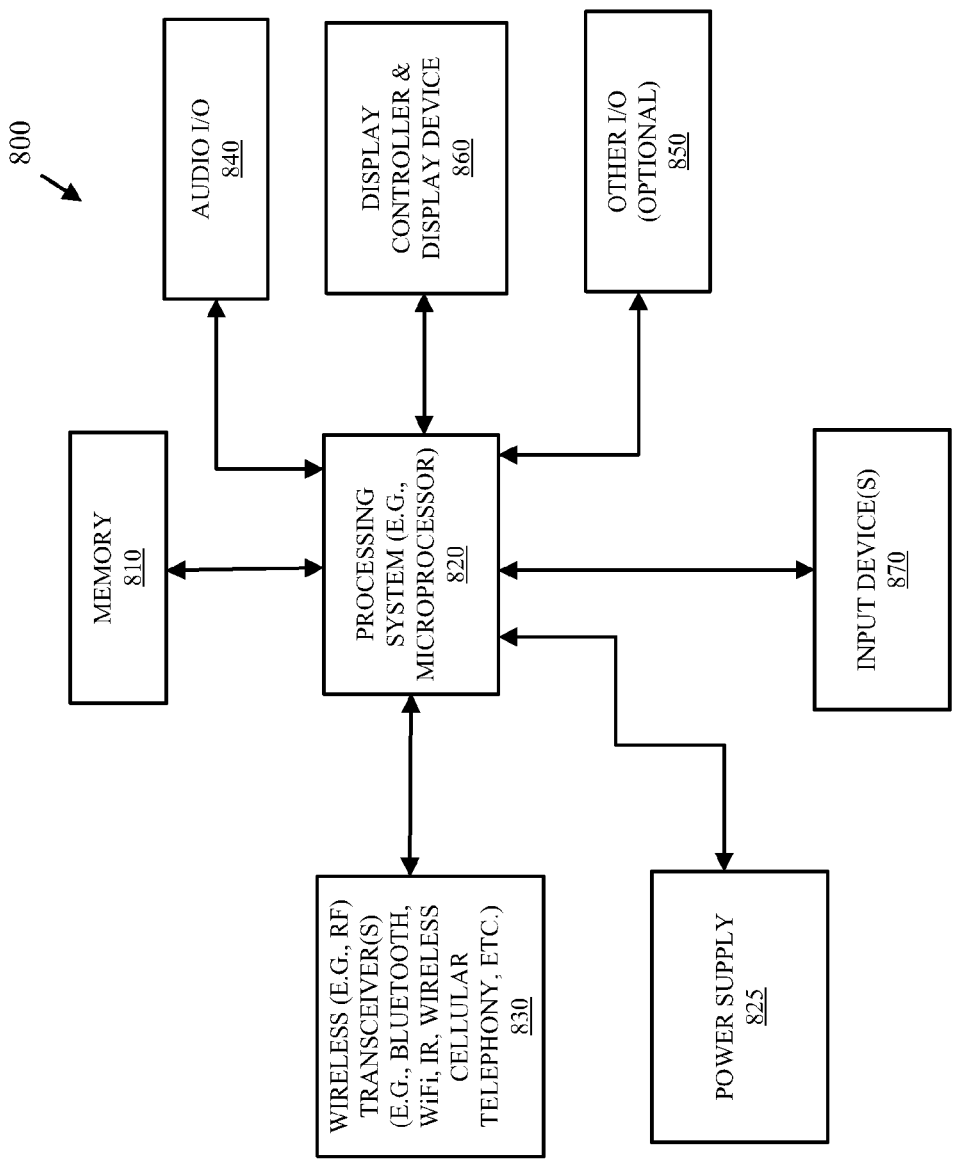
FIG. 8 is a block diagram illustrating an exemplary mobile device according to one embodiment of the invention.

FIG. 8 is a block diagram illustrating an exemplary data processing system which may be used in some embodiments of the invention. For example, the data processing system 800 may be a handheld computer, a personal digital assistant (PDA), a mobile telephone, a portable gaming system, a portable media player, or a handheld computer which may include a mobile telephone, a media player, and/or a gaming system. As another example, the data processing system 800 may be a network computer or an embedded processing device within another device.

According to one embodiment of the invention, the exemplary architecture of the data processing system 800 may be included in the mobile device 160. The data processing system 800 includes the processing system 820, which may include one or more microprocessors and/or a system on an integrated circuit. The processing system 820 is coupled with a memory 810, a power supply 825 (which includes one or more batteries) an audio input/output 840, a display controller and display device 860, optional input/output 850, input device(s) 870, and wireless transceiver(s) 830. It will be appreciated that additional components, not shown in FIG. 8, may also be a part of the data processing system 800 in certain embodiments of the invention, and in certain embodiments of the invention fewer components than shown in FIG. 8 may be used. In addition, it will be appreciated that one or more buses, not shown in FIG. 8, may be used to interconnect the various components as is well known in the art.

The memory 810 may store data and/or programs for execution by the data processing system 800. The audio input/output 840 may include a microphone and/or a speaker to, for example, play music and/or provide telephony functionality through the speaker and microphone. The display controller and display device 860 may include a graphical user interface (GUI). The wireless (e.g., RF) transceivers 830 (e.g., a WiFi transceiver, an infrared transceiver, a Bluetooth transceiver, a wireless cellular telephony transceiver, etc.) may be used to communicate with other data processing systems. The one or more input devices 870 allow a user to provide input to the system. These input devices may be a keypad, keyboard, touch panel, multi touch panel, etc. The optional other input/output 850 may be a connector for a dock.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A non-transitory computer-readable medium having instructions stored therein, which when executed by a processor in a mobile device cause the processor to perform operations for proxying a notification service between a mobile client of the mobile device and a notification server, the operations comprising:
   receiving a proxy setup request for the notification service from the mobile client;
   establishing a notification connection with the notification server for the mobile client;
   maintaining the notification connection with the notification server without waking an application processor of the mobile client from a sleep mode;
   receiving a notification from the notification service;
   bundling the received notification with another notification, wherein the bundling is determined based at least in part on a time of day and a battery life parameter of the mobile device;
   forwarding the bundled notifications to the mobile client; and
   waking the application processor.

2. The non-transitory computer-readable medium of claim 1, further comprising:
   scheduling a connection message interval for the notification service, wherein after the connection message interval, the application processor awakens and transmits a notification service connection message to the notification server.

3. The non-transitory computer-readable medium of claim 1, wherein the notification comprises a push notification.

4. The non-transitory computer-readable medium of claim 1, wherein the establishing the notification connection comprises:
   transmitting a response to the proxy setup request to the mobile client.

5. The non-transitory computer-readable medium of claim 1, further comprising:
   receiving an update request from the mobile client; and
   updating the mobile client with the update request.

6. The non-transitory computer-readable medium of claim 5, wherein the update request comprises an address change of the mobile client.

7. The non-transitory computer-readable medium of claim 1, wherein the maintaining further comprises:
   synchronizing transmissions of notification service connection messages for the notification service and a second notification service based at least in part on overlapping notification service connection message transmission windows.

8. The non-transitory computer-readable medium of claim 1, wherein the mobile device is without a data service, and wherein the forwarding further comprises utilizing a short message service (SMS).

9. The non-transitory computer-readable medium of claim 1, wherein the bundling is further determined based at least in part on a timeliness of a service.

10. The non-transitory computer-readable medium of claim 1, wherein the bundling is further determined based at least in part on a location of the mobile device.

11. A system for a proxy-based service, the system comprising:
    a processor; and
    a memory coupled to the processor, wherein the processor is configured to:
       establish a notification service connection between a mobile client of a mobile device and a notification server providing a notification service;
       schedule a connection message interval for the notification service, wherein after the connection message interval, an application processor of the mobile client awakens and transmits a connection message for the notification service;
       maintain the notification service connection with the notification server without waking the application processor of the mobile client from a sleep mode;
       receive a notification from the notification service;
       bundle the received notification with another notification based at least in part on a time of day and a battery life parameter of the mobile device; and
       forward the bundled notifications to the mobile client.

12. The system of claim 11, wherein the notification service connection message comprises a PING message or a hypertext transport protocol request.

13. The system of claim 11, wherein the notification comprises a push notification.

14. The system of claim 11, wherein to maintain the notification service connection without waking the application processor, the processor is further configured to keep a network stack awake.

15. The system of claim 11, wherein to bundle, the processor is further configured to bundle the received notification with the another notification based at least in part on a location of the mobile device.

16. The system of claim 11, wherein the bundling is further determined based at least in part on a timeliness of a service.

17. The system of claim 11, wherein the mobile device is without a data service, and wherein to forward, the processor is further configured to utilize a short message service (SMS).

18. A method for a proxy-based service, comprising:
    establishing a notification service connection with a notification server and a mobile client of a mobile device;
    maintaining the notification service connection with the notification server and the mobile client without waking an application processor of the mobile client from a sleep mode;
    determining a schedule to awaken the application processor and refresh the notification service connection;
    receiving a notification from the notification service;
    bundling the received notification with another notification, wherein the bundling is determined based at least in part on a time of day and a battery life parameter of the mobile device; and
    forwarding the bundled notification to the application processor.

19. The method of claim 18, wherein the determining the schedule to awaken the application processor comprises:
    scheduling a connection message interval for the notification service, wherein after the connection message interval, the application processor wakens and transmits a notification service connection message to the notification server.

20. The method of claim 18, wherein the establishing the notification connection comprises:

receiving a proxy setup request for the notification service from the application processor; and transmitting a response to the proxy setup request to the application processor.

* * * * *

UNITED STATES PATENT AND TRADEMARK OFFICE
CERTIFICATE OF CORRECTION

| | |
|---|---|
| PATENT NO. | : 9,749,435 B2 |
| APPLICATION NO. | : 13/355441 |
| DATED | : August 29, 2017 |
| INVENTOR(S) | : Li Li |

It is certified that error appears in the above-identified patent and that said Letters Patent is hereby corrected as shown below:

On the Title Page

Item (56), References Cited
On page 2, Other Publications, "Niranjan Balasubraman Ian et al," should read --Niranjan Balasubramanian et al,--.

Signed and Sealed this
Twenty-fourth Day of April, 2018

Andrei Iancu
*Director of the United States Patent and Trademark Office*